Figure 1:
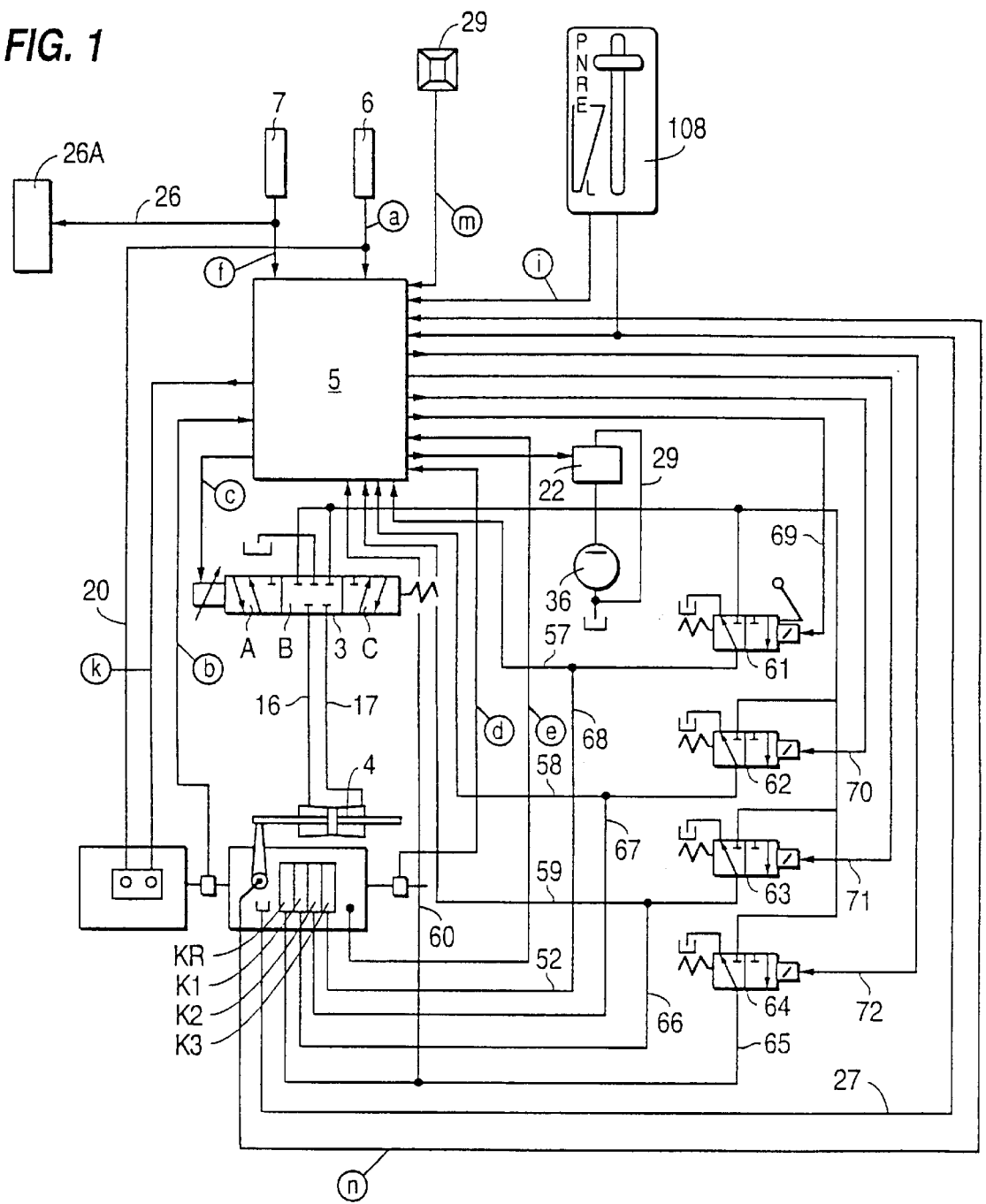

United States Patent

Meyerle

[11] Patent Number: 5,890,982
[45] Date of Patent: Apr. 6, 1999

[54] CONTINUOUS HYDROSTATIC-MECHANICAL BRANCH POWER SPLIT TRANSMISSION PARTICULARLY FOR POWER VEHICLES

[76] Inventor: Michael Meyerle, Kiefernweg 9 - lochbrücke, D-7996 Meckenbeuren, Germany

[21] Appl. No.: 808,752

[22] Filed: Feb. 28, 1997

Related U.S. Application Data

[62] Division of Ser. No. 231,724, Apr. 20, 1994, Pat. No. 5,683,322.

[30] Foreign Application Priority Data

| Apr. 21, 1993 | [DE] | Germany | 43 12 974.9 |
| Jun. 1, 1993 | [DE] | Germany | 43 18 075.2 |
| Nov. 23, 1993 | [DE] | Germany | 43 93 864.2 |

[51] Int. Cl.⁶ .......................... F16H 47/02; F16H 57/00; B60K 17/04
[52] U.S. Cl. ................................. 475/72; 475/80; 475/81
[58] Field of Search .................... 475/72, 74, 76, 475/78, 81, 82; 74/730.1, 732.1

[56] References Cited

U.S. PATENT DOCUMENTS

| 5,207,736 | 5/1993 | Fredriksen | 475/72 X |
| 5,337,629 | 8/1994 | Kita | 475/72 X |
| 5,496,223 | 3/1996 | Jarchow | 475/72 |
| 5,624,339 | 4/1997 | Coutant et al. | 475/72 |

*Primary Examiner*—Khoi Q. Ta
*Attorney, Agent, or Firm*—Shook, Hardy & Bacon, L.L.P.

[57] ABSTRACT

A hydrostatic/mechanical branch power split transmission for power vehicles is disclosed. The transmission includes an infinitely variable hydrostatic converter having a first hydrostatic unit of adjustable volume and a second hydrostatic unit. The transmission also includes a power distribution system whereby the driving power is split into a hydraulic and a mechanical branch and is summed again before the transmission output. The transmission permits various driving strategies or driving programs which can be conveniently adjusted and accessed. There is also a hydrostatic connection which can be switched at several gear racial points. The breaking capacity of the engine and the maximum breaking effect through continuous hydrostatic converter can be utilized and easily controlled. A further variant also enables breaking energy to be recuperated with the hydrostatic converter. The continuous converter can be precisely adjusted to optimize gear shift range selection.

17 Claims, 13 Drawing Sheets

CONTINUOUS HYDROSTATIC-MECHANICAL BRANCH POWER SPLIT TRANSMISSION PARTICULARLY FOR POWER VEHICLES

The present application is a continuing application claiming subject matter fully disclosed in parent application Ser. No. 08/231,724 filed Apr. 20, 1994 (now U.S. Pat. No. 5,683,322).

The object of the invention is a continuous transmission, preferably a hydrostatic power split transmission and its control system, particularly for power vehicles, as specified in the preamble of the main claims. The transmission permits various driving strategies or driving programs which can be conveniently adjusted and accessed. There is also a hydrostatic connection which can be switched at several gear ratio points; the braking capacity of the engine and maximum braking effect through the continuous hydrostatic converter can be utilized and easily controlled. A further variant also enables braking energy to be recuperated with the hydrostatic converter. The continuous converter can be precisely adjusted to optimize gear shift range selection.

Similar sub-units are known in the art, but they incur greater penalties in terms of cost, weight and space requirements.

The function of the object of the invention is to eliminate these disadvantages, especially in the case of continuous transmissions, especially hydrostatic-mechanical power split transmissions. The improvement to the equipment disclosed in EP-A-0280 757 also makes better use of the advantages of continuous transmissions.

In the device disclosed this is achieved by the features listed in the main claims. Further advantageous variants of the invention are given in the sub-claims and the description.

The invention is explained with reference to drawings relating to different versions. The drawings are as follows:

FIG. 1 An additional version of the control device for a gearbox with several gear shift ranges.

Figure 2:
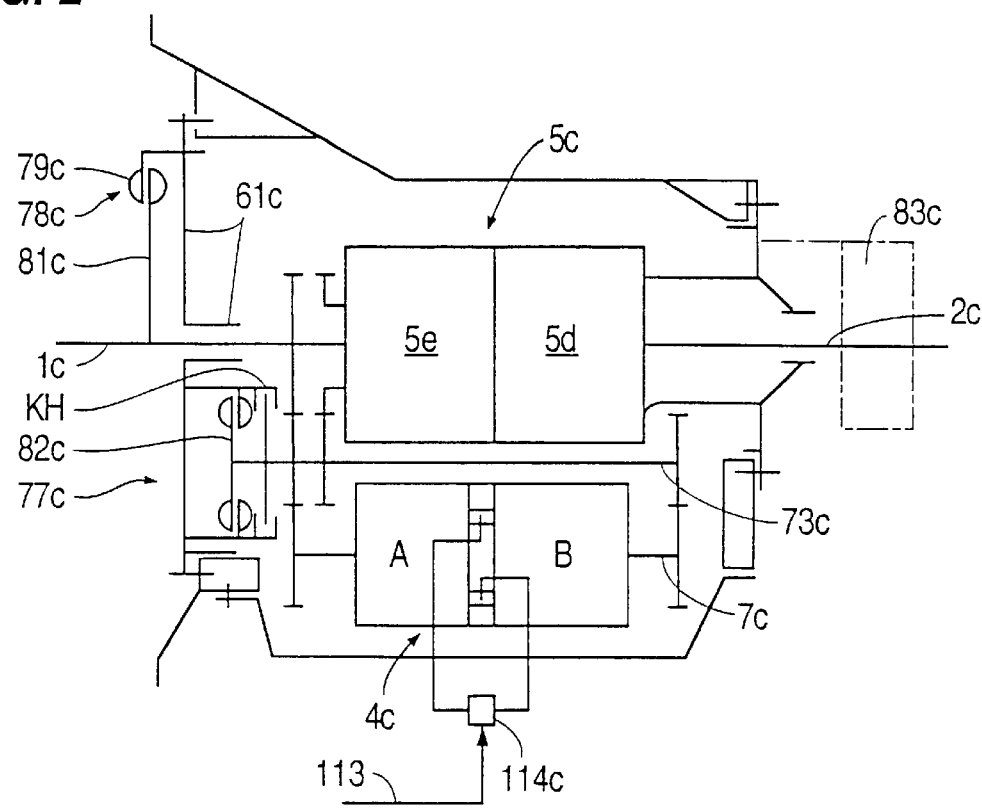

FIG. 2 Gearbox design with traction booster.

Figure 3:
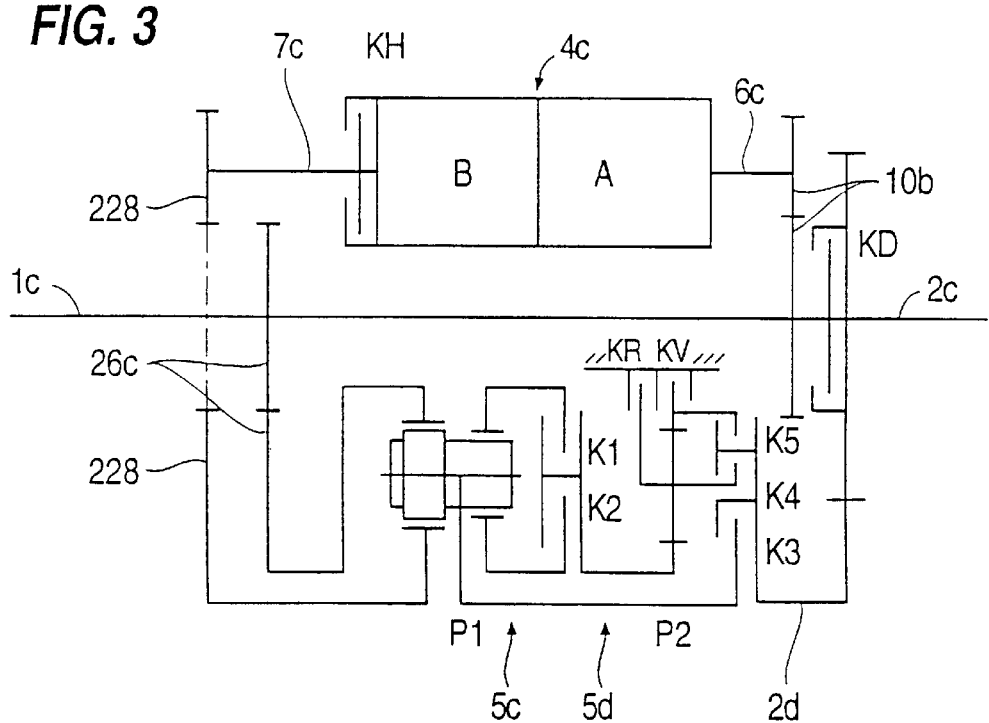

FIG. 3 View of summing/split transmission system.

Figure 4:
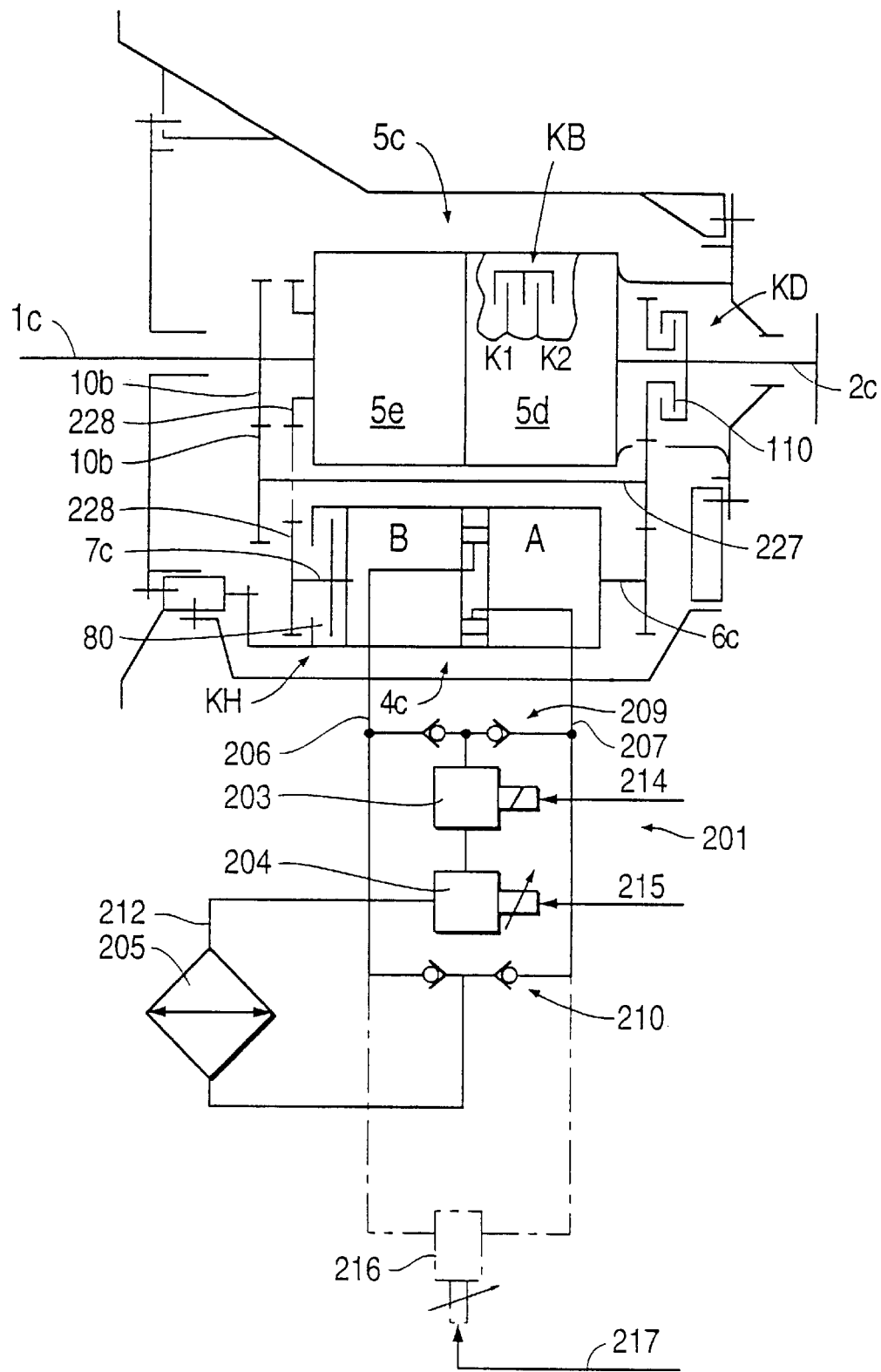
Figure 4A:
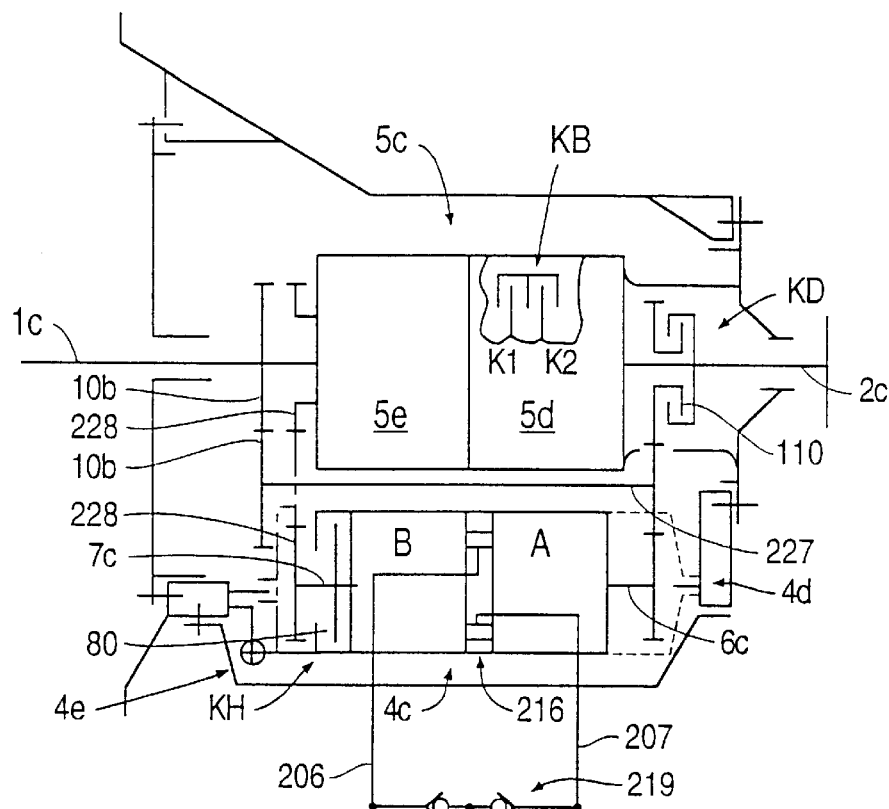
Figure 4B:
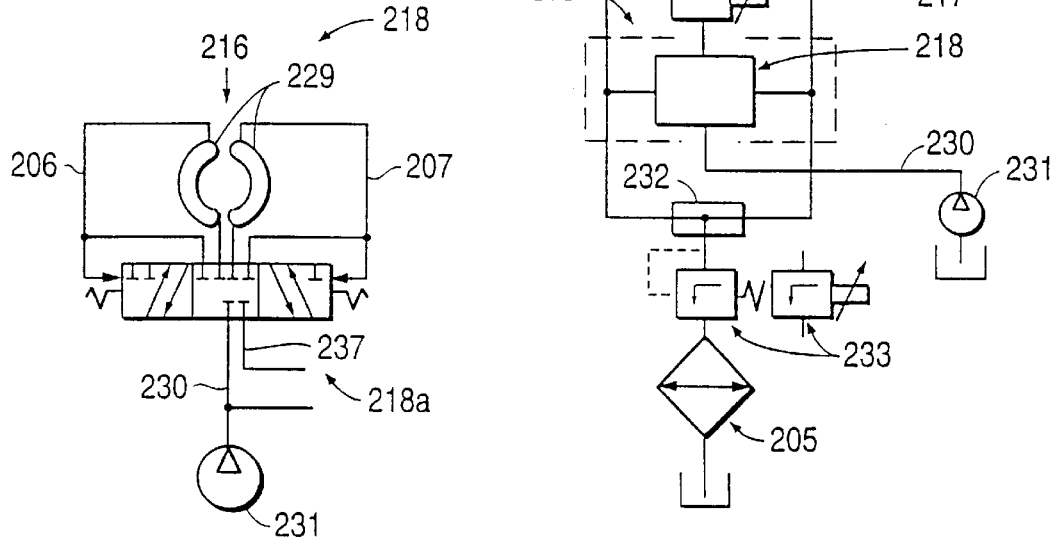
Figure 4C:
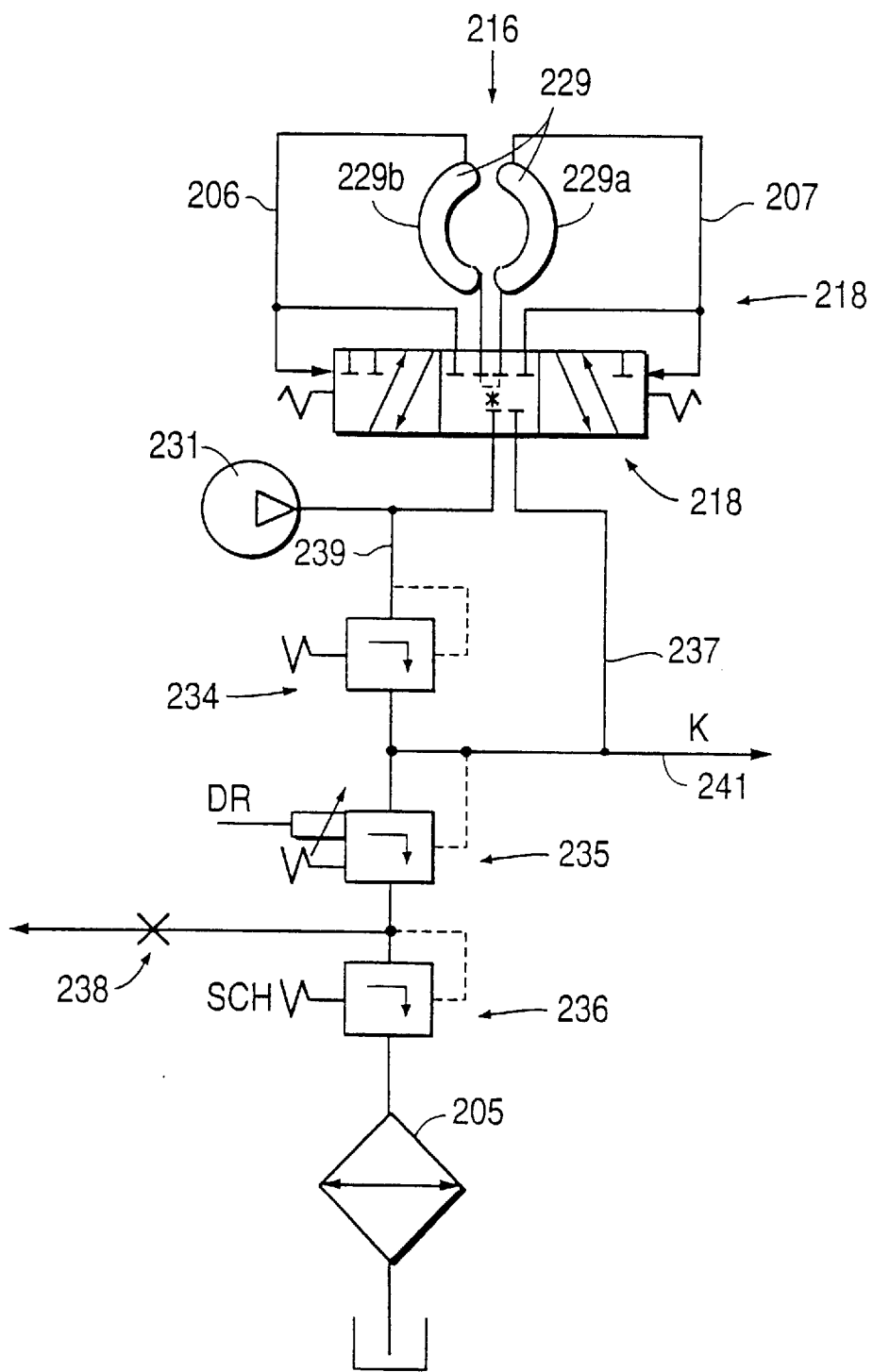

FIGS. 4 to 4c Transmission design with hydrostatic retarder.

Figure 4D:
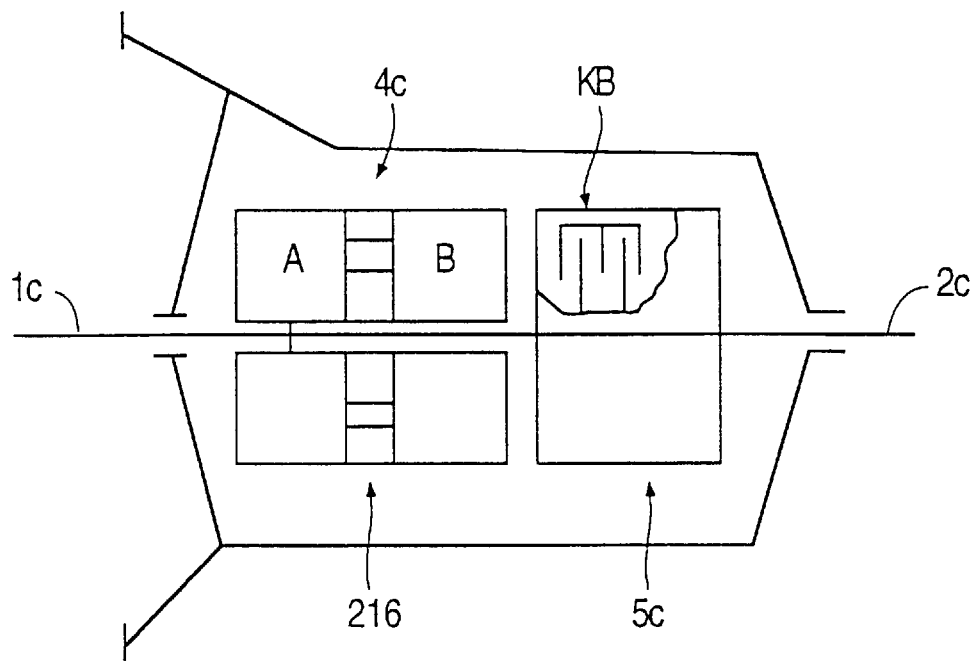
Figure 4E:
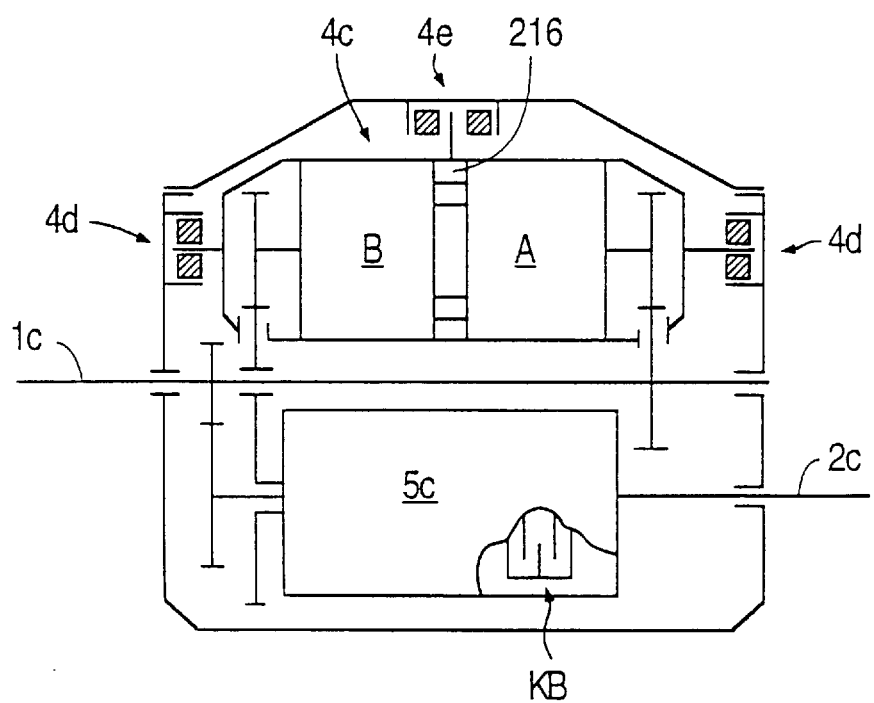

FIGS. 4d–4e In-line type hydrostatic power split transmission which can be fitted with the claimed devices.

Figure 5:
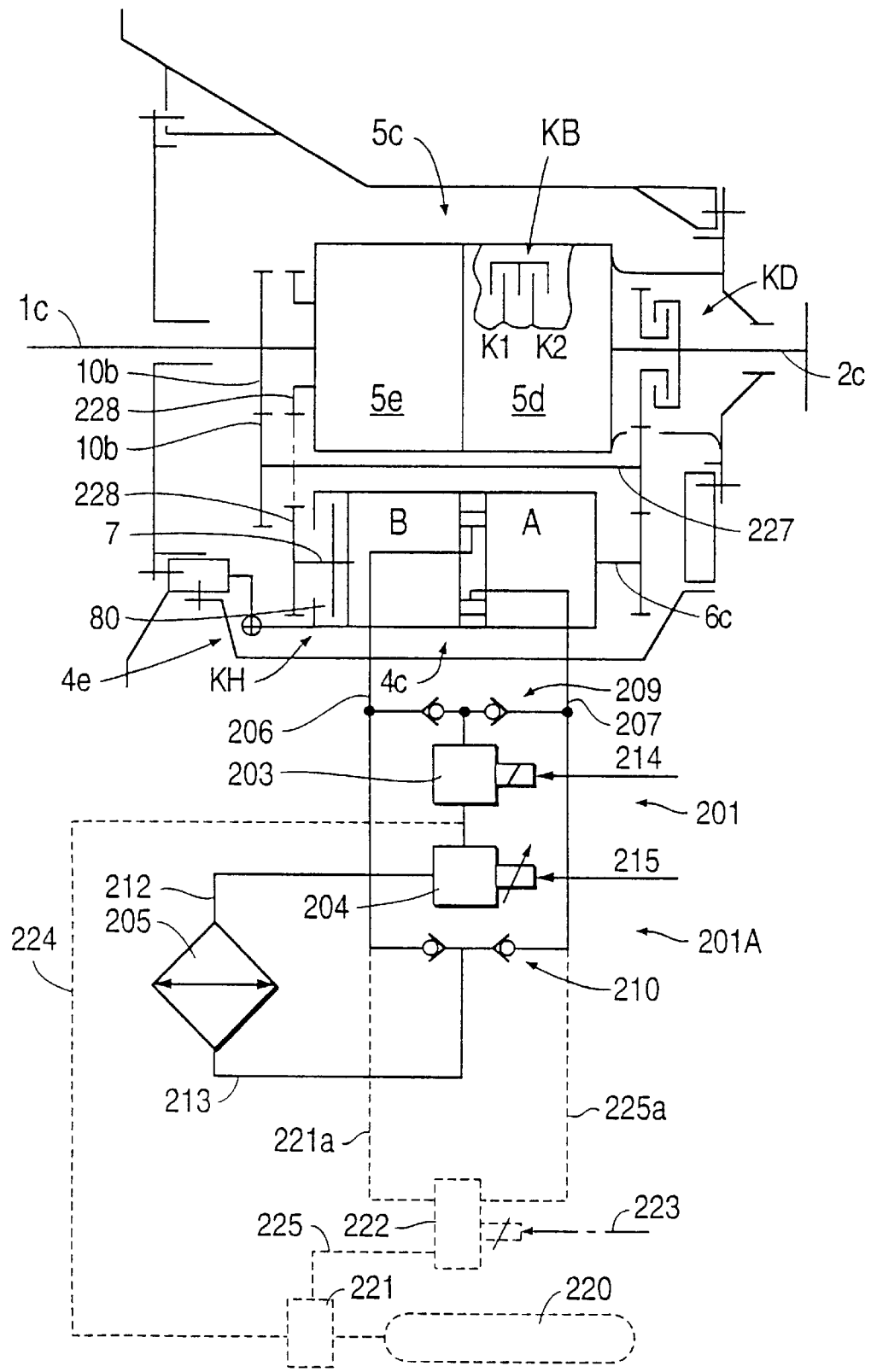

FIG. 5 Transmission with regenerative braking device.

Figure 6:
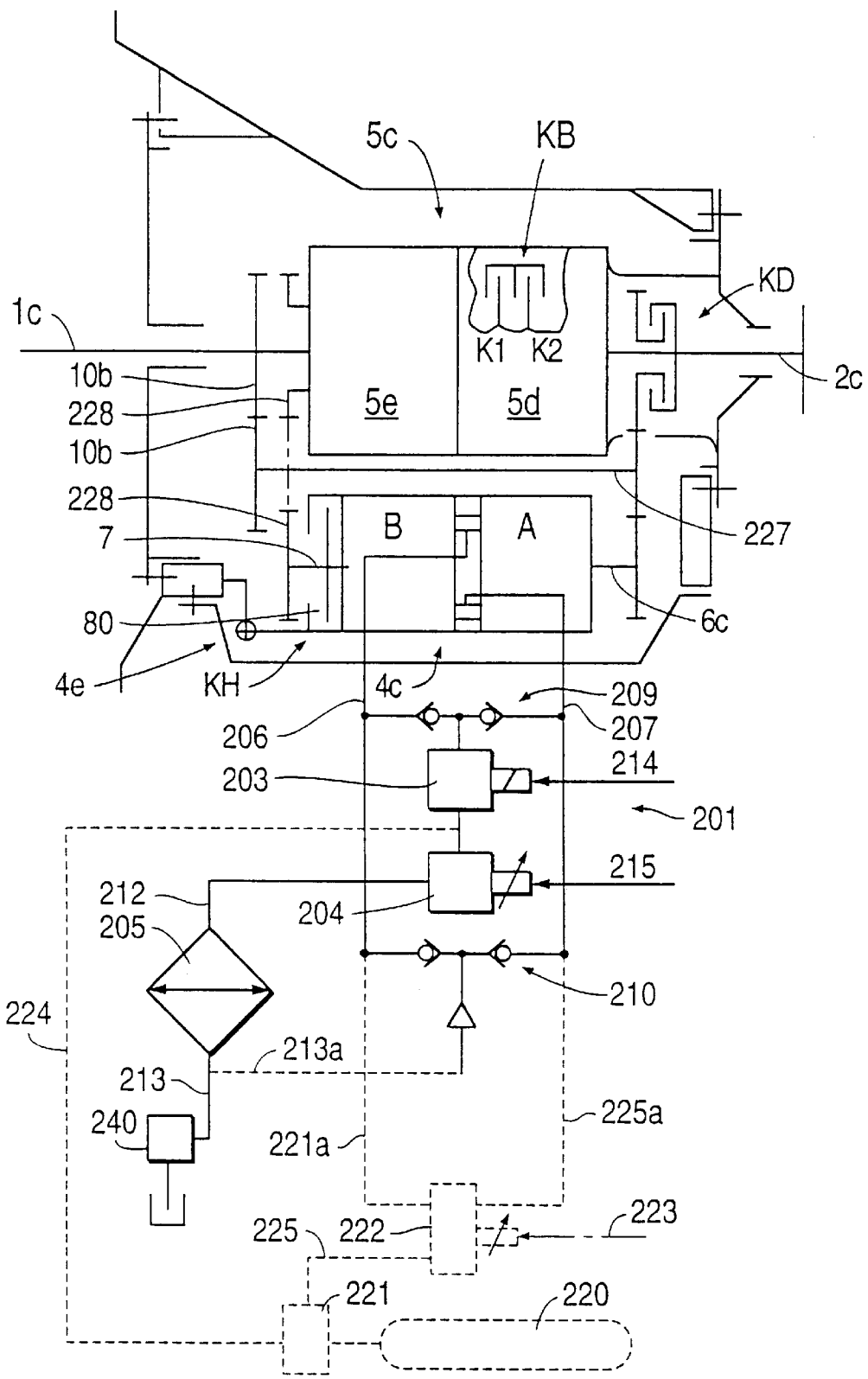
Figure 6A:
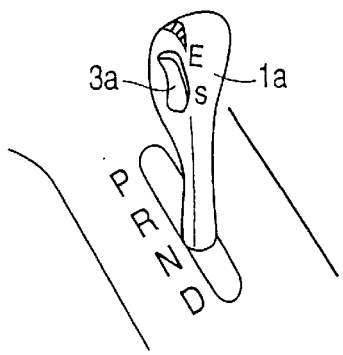
Figure 6B:
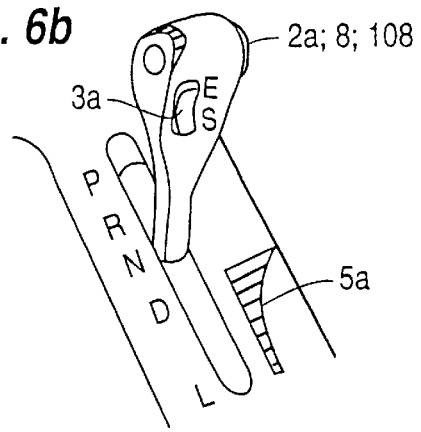

FIGS. 6a and 6b Selector lever with program preselect device and/or infinitely variable transmission adjustment.

Figure 6C:
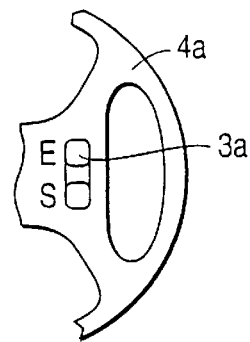

FIG. 6c Alternative to operating device as in 6a and 6b, but steering-wheel mounted.

Figure 6D:
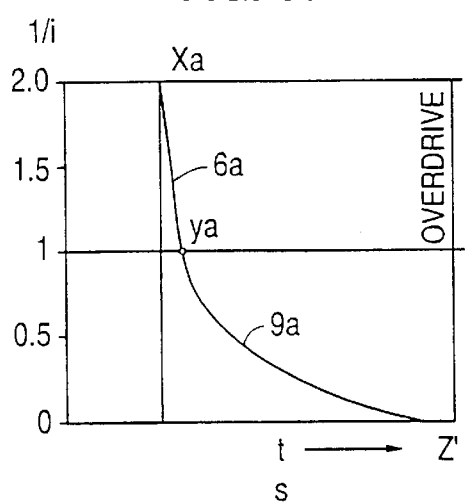
Figure 6E:
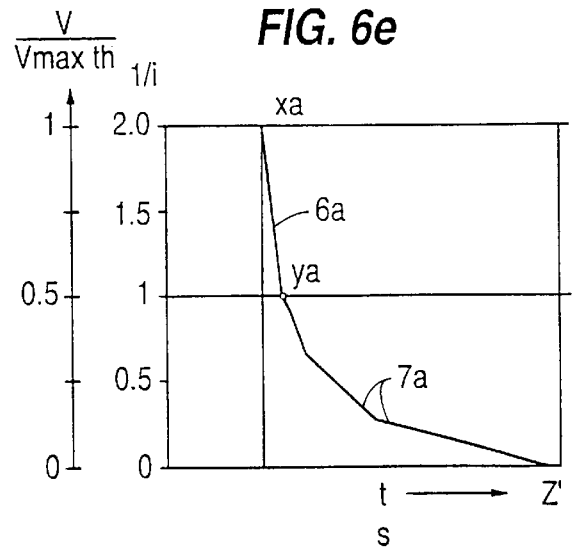

FIGS. 6d and 6e Diagrams illustrating the adjustment sequence for setting a constant speed or constant gear ratio depending on the setting time "t" or the setting travel "s".

Figure 6F:
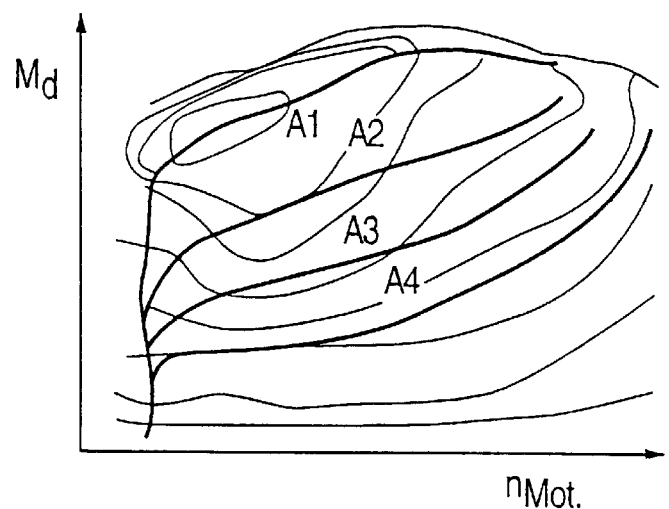

FIG. 6f Consumption curve.

Figure 6G:
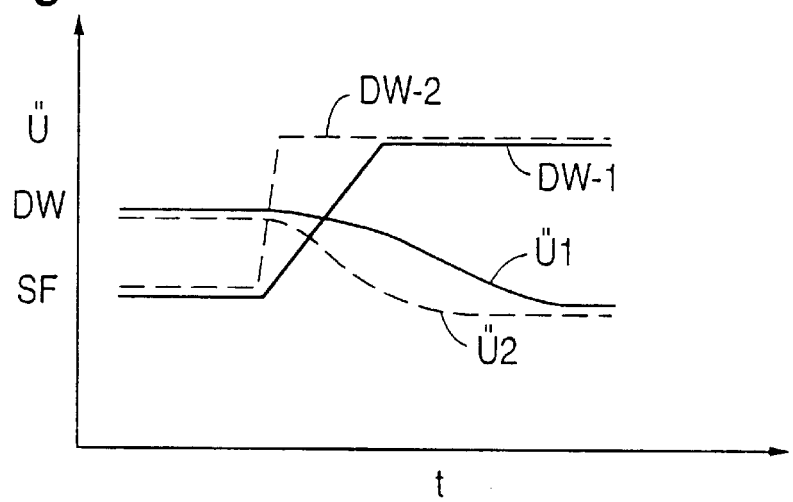

FIG. 6g Acceleration graph.

Figure 6H:
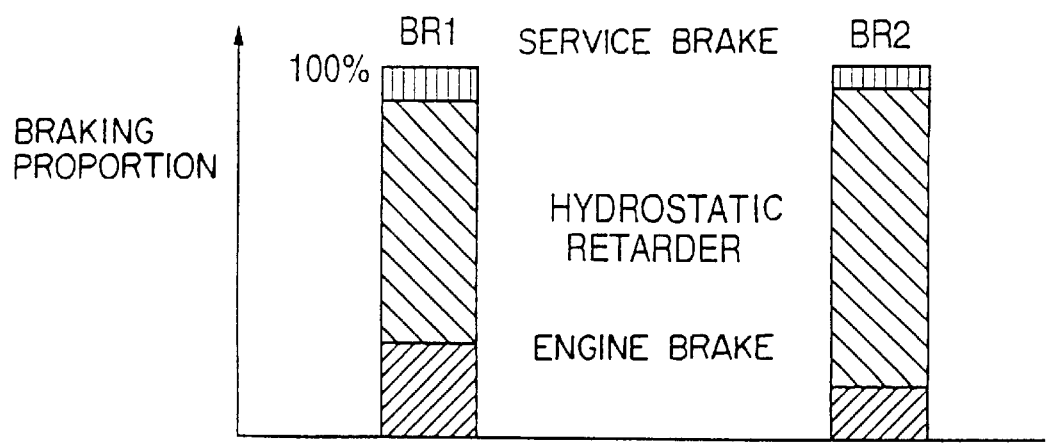

FIG. 6h Chart of braking proportions.

Figure 6I:
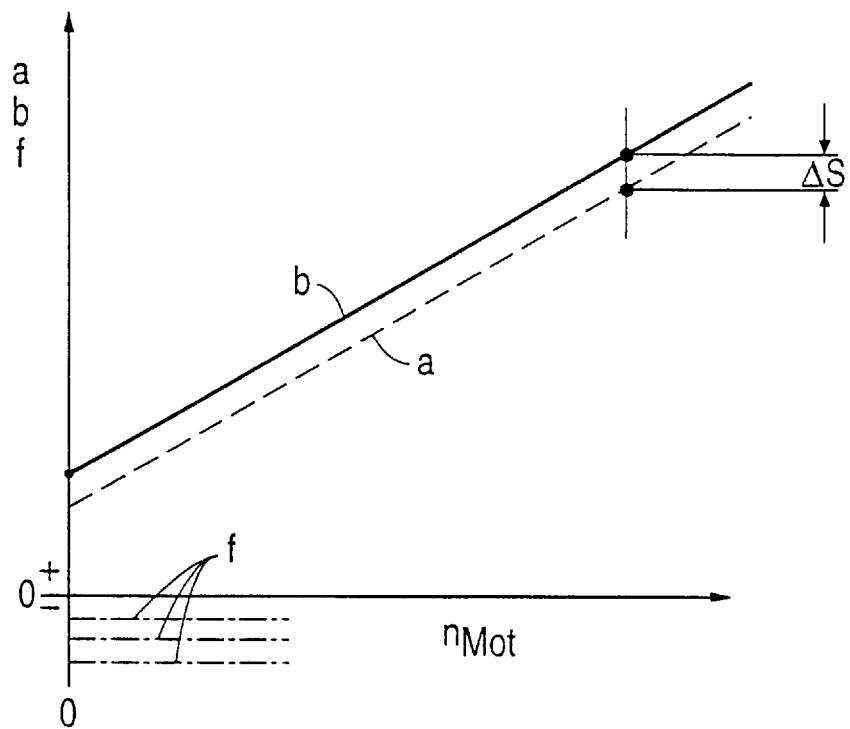
Figure 6K:
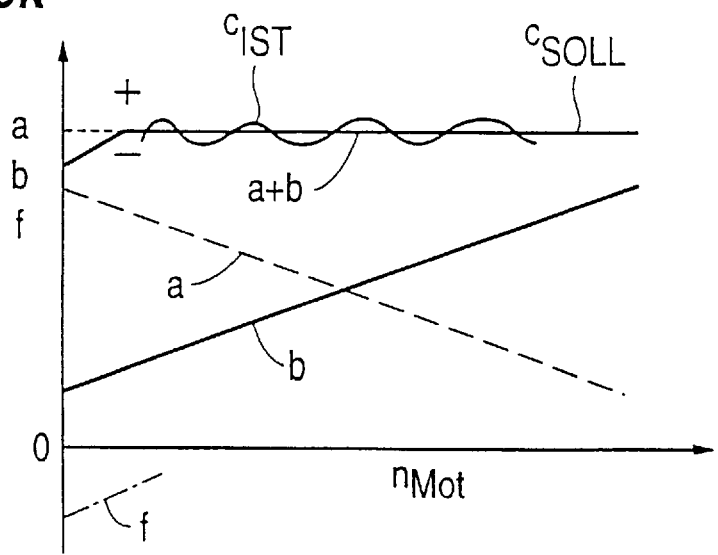

FIGS. 6i and 6k Drive control diagram.

Figure 7:
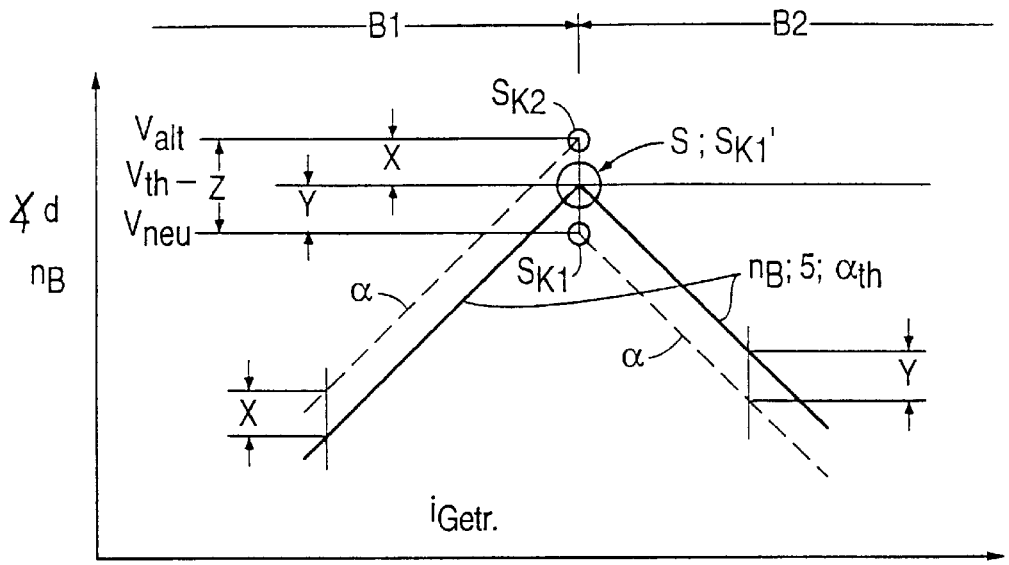
Figure 7A:
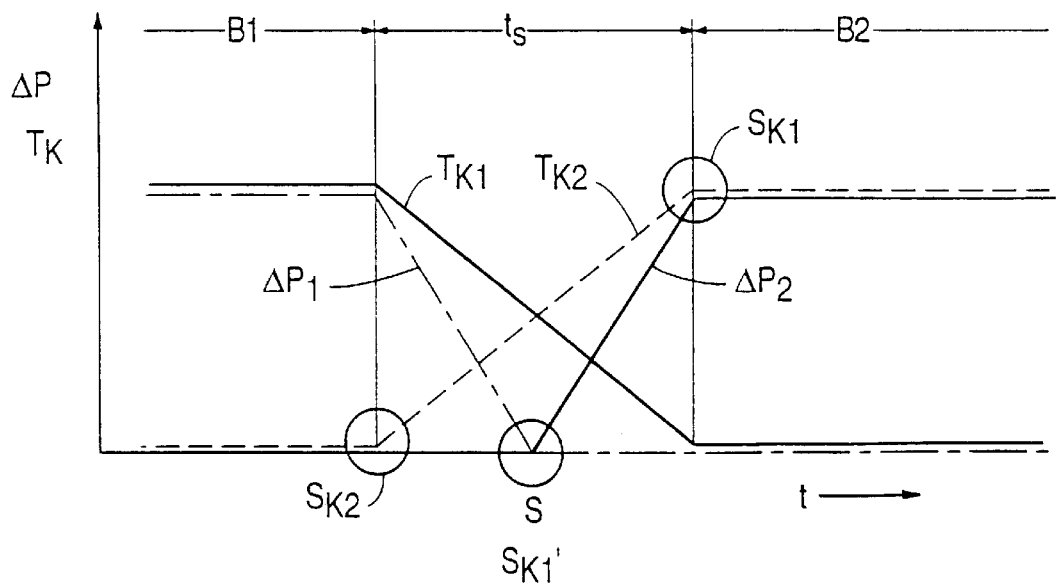

FIGS. 7 and 7a Profile of adjustment, speed, torque and pressure during a shifting sequence.

Figure 8:
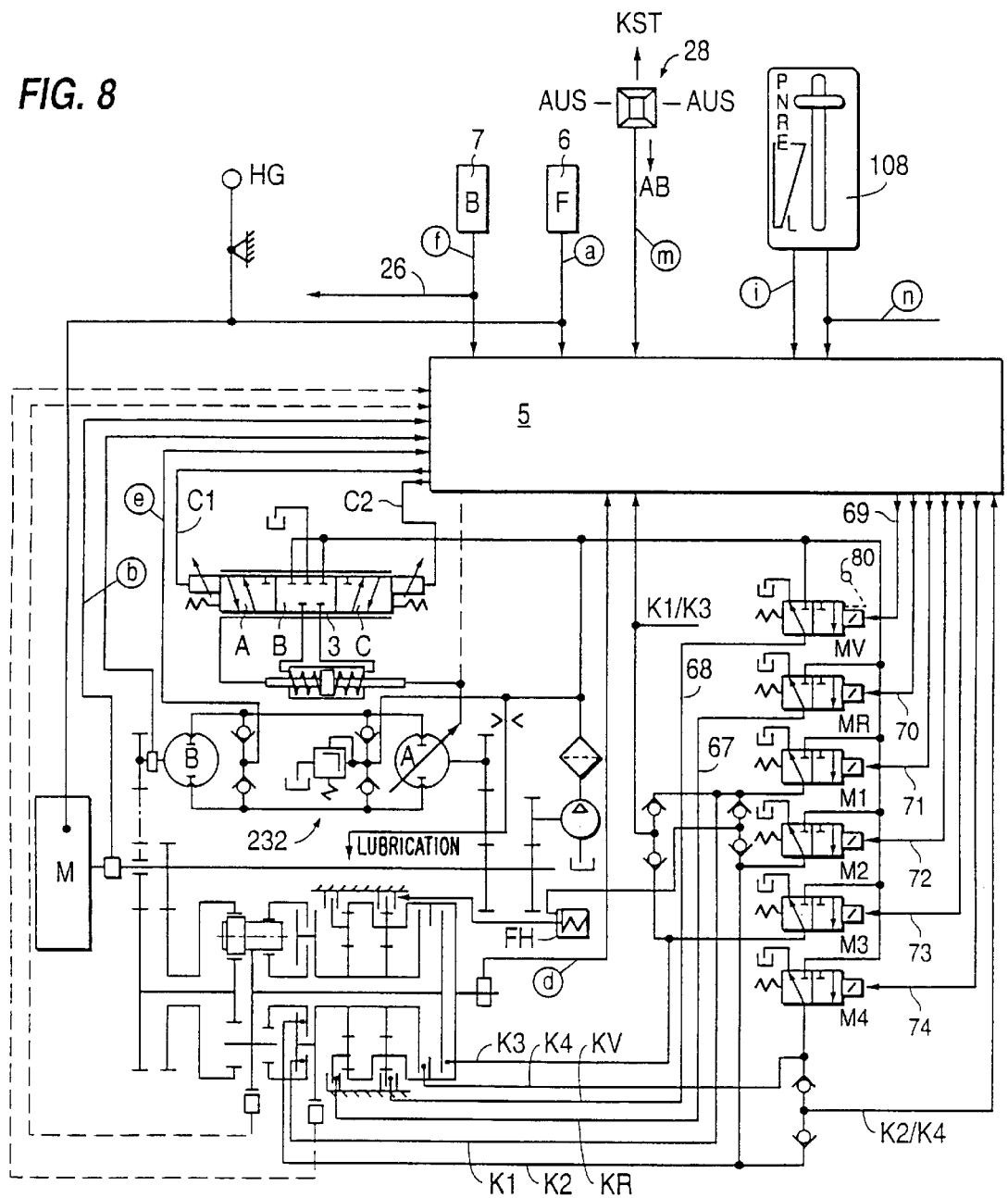

FIG. 8 Circuit diagram

As already disclosed in European patent application 0 280 757, the accelerator pedal or foot-activated controls in the area of the accelerator can be used for drive program preselection (overdrive range or high-performance program). The invention uses the speed of movement of the accelerator pedal 6 as an actuating variable or control pulse to activate one or more of the driving programs, similarly to the known control device mentioned above. A short dab on the accelerator pedal gives control device 5 the command to trigger the corresponding high-performance program, increasing the engine speed, e.g. in preparation for an overtaking maneuver. One program or several programs (A1; A2; A3; A4—FIG. 6f) are available to accommodate various types of driver or a driver's different demands.

The invention also incorporates infinitely variable shifting of a pre-set driving program or of a curve A1, which moves infinitely within the fuel economy range from an optimum consumption curve A1 to a maximum high-performance curve A4 (see FIG. 6f), depending on the speed of adjustment of the accelerator pedal. This infinitely variable ratio adjustment allows an almost ideal adaptation to the most diverse driving conditions. The above driving program can also be manually preselected within a lower and upper limit. There is also a useful individual program facility programmable in steps A2; A3; A4.

In this way the control unit permits a high degree of individuality of driving style. The driver can very quickly and simply select a suitable gear ratio to suit his preference or the prevailing driving conditions-either an economy-oriented function or a high-performance sports function. When preparing for an overtaking maneuver for example the driver can first switch off the overdrive range, and trigger a further reduction in gear ratio (using the same control unit if required), either by hand or with a dab on the accelerator pedal (or possibly several, or possibly a device for sideways foot movements), further increasing the engine speed so that at the start of the overtaking maneuver most or all of the engine's power is rapidly available. An automatic gear ratio reduction limiter is preprogrammed in the device disclosed (or one adapting to the current operating conditions), to prevent the engine overspeeding when the gear ratio is further reduced. This process ideally determines an optimum engine speed limit adapted to the operating conditions. These engine speed limits can be represented as an engine speed limit curve, and are derived from evaluating aspects of engine noise and/or acceleration capability. The control device for the transmission itself is functionally so designed that when the overtaking maneuver has been completed, the fuel economy program takes over automatically, and the engine returns to the more fuel-efficient curve. This function can be preprogrammed, e.g. dynamically related to time and/or load or the position of the accelerator. The driver can remain in the high-performance program if desired, using a control unit (either separate or combined) to trigger a suitable high-performance program. The "S" key can be fitted with two detent positions, one for one-off acceleration, and the second position for continuous high-performance mode.

A particular feature of the invention is that the speed of ratio adjustment is automatically adapted continuously by the signals which automatically operate to detect uphill climbs, downhill runs, bends, acceleration, deceleration and winter driving.

In the device disclosed there is a gear ratio reduction damper or retarding device which adapts to different types of driver to reduce the gear ratio during acceleration in such a way as to achieve a comfortable, smooth acceleration sequence and improve acceleration performance and noise level depending on the current engine acceleration, so that the engine can speed up with an infinitely variable torque load. This can be achieved either by the damping effect programmed into the control unit and adapted to the various accelerator pedal adjustment characteristics or driver characteristics, and/or by a programmed deceleration signal from the hydrostatic pressure signal, and/or a deceleration signal from e.g. a variable dependent on engine load. FIG. 6g shows the corresponding adjustment curve or gear ratio change Ü1; Ü2 for slow accelerator pedal movement and throttle valve adjustment (DW1), and fast (DW2).

The device disclosed thus provides in particular a control unit enabling automatic infinitely variable transmission adaptation to the most varied driving and operating situations without any input from the driver, giving a high level of ride comfort, driving safety, performance, and fuel economy. For this purpose correct transmission adaptation and the correct rate of change of the infinitely variable transmission in the various driving and operating conditions are in particular of decisive importance. The control unit is influenced in this respect by the speed of accelerator pedal adjustment, by the differences in rotational speed between the rear and front wheels, and/or by signals from the centrifugal forces acting on the vehicle, e.g. when cornering. Changes in gear ratio can also be influenced by load-dependent signals, e.g. the hydrostatic pressure signal and/or accelerator pedal or throttle valve adjustment signal. For cornering, the invention provides more or less damping or blocking of infinitely variable transmission shifting depending on the degree of lateral acceleration, i.e. the lateral acceleration signals prevent excessively rapid change in gear ratio upwards.

Unpleasant upward and downward shifting [is prevented] when driving uphill by recognizing uphill slopes from the load signal (hydrostatic pressure signal) and/or the accelerator pedal position signal and road speed, and/or from the general acceleration profile.

For downhill runs a transmission lock is fitted which is activated as a function of the brake pedal, and/or by detecting momentum. The desired speed is set by the brake pedal, and is retained after the pedal is released, working in a similar way to a cruise control, with the engine doing most of the braking until a defined engine speed is reached. If the vehicle speed cannot be maintained by the engine brake (as indicated by excessive revving of the engine), then the service brake cuts in, triggering a further infinitely variable reduction in gear ratio and road speed. When accelerating, the transmission lock is set to shift up continuously, at a rate depending on the movement of the accelerator pedal.

The control can moreover be so designed that on downhill runs it is possible to drive using only engine braking, without using the brake and consequently without wear on the brakes, using the engine speed signal to automatically adapt the speed or gear ratio to the road conditions.

To ensure delicate, precise adjustment of a selectable constant speed, the invention provides that until the desired constant speed or constant gear ratio is reached, the adjustment speed achieves a rapid change in adjustment in the higher speed or transmission range 1/i, and at a lower speed a slow change in transmission range. Especially in the lower speed range, fine adjustment is very important, for example to be able to hold a particular crawling speed, as is necessary for tractors. As shown in FIG. 6b, in the high-speed range there is rapid, preferably linear gear ratio reduction until a transmission point "Ya" is reached, and from point "Ya" to "Za" an ever slower adjustment relating to the adjustment time or the adjustment travel. This guarantees that very low speeds or crawling speeds can be delicately and precisely controlled. The adjustment shown in FIG. 6d represents a continuous curve 9a. Another profile with 3 straight lines 6a, 7a and 8a, becoming flatter and flatter, is evident, as shown in FIG. 6e. These adjustment characteristics, as shown in FIGS. 6d and 6e, can be electronic, or can use mechanical elements, e.g. cam plates or lever/travel devices. The adjusting lever can be a separate lever, or the selector lever 1a, 2a could be used. An adjustment symbol 5a gives a setting guide. Intermediate settings of the adjusting lever 1a, 2a can in certain cases be helpful as a rough guide. A digital display on the dashboard which can be manually set, is also helpful.

The controls (key 3a or adjustment lever) can be fitted anywhere in the vehicle. The preferred arrangement is to mount the controls on the selector lever (1a, 2a ) in the familiar manner, as for example in FIGS. 6a and 6b, or on the center console. The control can also be fitted to the steering wheel (FIG. 6c) if convenient.

The controls can be of any type, either push-buttons or rocker switches, to preselect the overdrive range or the upper transmission range and to switch off the overdrive range and at the same time to set a constant speed or a constant gear ratio.

For winter operation, the device has a driving program which prevents wheel slip by automatically modulating the hydrostatic pressure with a pressure regulator or a bypass valve 114c; 216, and the corresponding control signal 113 resulting from one or more of the operating signals such as the engine speed signal (b) and/or transmission gear ratio signal and/or manual activation signal and/or an engine speed differential signal (b) and accelerator pedal signal (a) and/or throttle valve position signal DW. The control information is derived from the tire slip and/or differing wheel speeds and the differences in speed of rotation detected and communicated, causing the pressure regulation to change with an appropriate pressure modulation. For this purpose it is advantageous and cost-effective to use the signal transmitters already present in the ABS braking system. The hydrostatic pressure is automatically detected in relation to the tractive resistance as the control variable for permissible propulsive force, and modulated accordingly. In a simplified version, a more or less focused pressure modulation for hydrostatic pressure can be produced from a signal derived from the movement or position of the accelerator pedal, in such a way that for example the above-mentioned pressure regulating valve or bypass valve which short circuits the two working pressure lines (high pressure, low pressure) with adjusted throttle effect, modulates the working pressure and thus the propulsive force by means of the accelerator pedal movement acting through control line 217.

Different drive controls or driving programs are available depending on the type of vehicle and its specific operational requirements. For working vehicles such as tractors, a program is required for economical control, which is particularly relevant for transport and all agricultural use, without power takeoff, with speed limitation. When this program is preselected, the engine runs most of the time within the engines optimum fuel efficiency range. There is by contrast a high-performance program oriented chiefly towards extracting maximum power from the engine. This enables the vehicle to be equipped with an accessory enabling a maximum engine speed to be preselected, e.g. to prevent unpleasant levels of engine noise or excessive geared-motor wear. This accessory is also suitable for braking during long downhill runs, using the optimum braking effect of the engine. The transmission gearing is appropriately adapted by means of the engine speed signal, as described below in greater detail.

Tractor power takeoff operation normally requires a given constant engine speed. In the device disclosed, when power takeoff mode is selected by activating the power takeoff clutch or power takeoff circuit, constant-speed engine control (RQV) is automatically engaged. The road speed can be adapted according to the tractive resistance and the power available at this engine speed, either automatically or through a suitable manual adjustment. A separate operating device is provided for all the above-mentioned driving programs (economy, high-performance, constant-speed running for power takeoff), preferably a push-button switch in the case of tractors. The corresponding signals for carrying out the necessary functions are, as described below in greater detail, preferably accommodated in an electronic control unit as known in the art. In this configuration the engine is preferably fitted with a governor with both a power regulator (RQ regulator) and an engine speed regulator or variable speed governor (RQV control), whereby e.g. when Economy mode or Transport mode is selected the known RQ control unit is activated, and when power takeoff mode is selected the known RQV control unit is activated. An engine regulator of this type is described in greater detail in the periodical "Automobilindustrie" 5/86 page 653 under the title "EDR electronic diesel regulator for commercial vehicle engines". The engine can also run broadly within the optimum consumption range when high-performance mode (RQV) is selected, if an operating program is provided which ensures the engine speed stays within certain limits depending on the operating conditions, as described below in greater detail.

Specific aspects of the control/regulator are described in greater detail below, and lead to some improvements to the equipment as disclosed in European patent application 0 280 757.

Tractor power takeoffs require a constant engine speed, as mentioned above. To achieve this, the engine is normally fitted with a governor (RQV regulator). When a particular speed is selected, it must be possible to change the gear ratio if the power limit of the engine at this speed is exceeded. In the device disclosed there is an additional control unit which works in combination with the RQV engine regulator to achieve the above change in gear ratio. A particular engine speed value is allocated to each accelerator pedal position. For this purpose a signal (a) is given depending on the accelerator pedal or manual throttle setting, as shown in FIG. 6i, e.g. running parallel to the engine speed signal (b), and is a differential amount (s) smaller than the above engine speed signal. If the engine speed is now reduced at a preselected transmission setting as a function of load, the engine speed signal (b) becomes less than the accelerator pedal signal (a), which automatically triggers a signal to increase the gear ratio, reducing the engine load and the road speed accordingly. The gear ratio is automatically adjusted by comparing the engine speed signal (b) and the accelerator pedal travel signal (a). The accelerator pedal signal is thus always smaller than the engine speed signal. If the engine speed signal is now exceeded, e.g. by acceleration in normal Drive mode without fixed road speed and engine speed limitation, the transmission automatically tends to shift down as with a kick-down function, so that the engine can adapt to its new speed of rotation as quickly as possible. With a view to achieving optimum drivability, the accelerator signal is corrected here too, as with the RQ regulator, and input to the control unit with a time delay. Different degrees of delay are programmed depending on the dynamic force of the accelerator pedal adjustment, i.e. the delay relates to the force. The invention provides various functions for starting up with an RQV-regulated engine. When starting up it is helpful if, as known in the art with automatic transmissions, the direction of travel is selected with the selector lever 108; 1a with the brake 7 held down. With the engine speed signal increased for driveaway, the brake signal (f) reduces it by one increment, corresponding to the transmission condition "infinite", or vehicle at rest. When the brake is released, the engine speed signal (b), which has been increased for driveaway, comes into effect, triggering a change in gear ratio for driveaway. Another option for the start-up function can be provided by a bypass valve 144c which works in the start-up range and is connected between the two working pressure lines, serving also for the Winter program; this valve is opened by the brake pedal and the corresponding control line 113, and gradually closed when the brake is released. The bypass valve 114c can also be triggered with the accelerator pedal; the bypass function is switched off proportionately as the accelerator is applied. An adjustable or controllable hydrostatic adjustment stop can also fix the transmission final position with the vehicle at rest. For greater security when moving off, it is advisable to program the automatic control unit in such a way that the direction of travel can be preselected only when the brake is activated; i.e. the first range clutch can be engaged only when the brake signal (f) is effective.

This type of control is also effective for normal drive control, with neither the engine speed nor gear ratio preselected. Each accelerator pedal position is allocated to a particular engine speed and engine torque, corresponding to the full-load torque curve. The full-load torque curve also corresponds to the optimum economy curve of the engine, which also achieves efficient overall operation. The transmission gearing which corresponds to full load at this accelerator pedal setting and the engine speed set by the RQV regulator, are automatically adjusted by the accelerator pedal with the engine speed signal and the accelerator pedal travel signal. The accelerator pedal travel signal and engine speed signal together determine the adjustment balance for the automatic transmission. To ensure comfortable acceleration performance, there should be no excessively sudden change to a larger gear ratio, to prevent unpleasant high engine revving. To reduce the noise level when accelerating, a suitable retarding device should be provided or programmed in, either in the accelerator pedal travel signal and/or in the transmission adjustment device and/or in the engine speed signal. The above type of control thus facilitates comfortable automatic drive control even with an RQV engine regulator.

As illustrated in FIG. 1, gear adjustment can be by means of a signal (c) derived from two or more operating signals, especially engine speed signal (b) and accelerator pedal signal (a) or throttle valve angle DW, or by means of a so-called EP adjustment, as per FIG. 8 with two input signals C1 and C2 to adjust the hydrostatic gearbox. C1 and C2 are electrical values which act on an electrical adjustment with a proportional magnet, and are a proportional function of the hydrostat setting.

The invention further involves an automotive transmission, particularly with power split, consisting of an infinitely variable converter 4c as per FIGS. 2; 3; 4; 5, preferably a hydrostatic converter consisting of a first and second hydrostatic unit, both units preferably forming a common modular unit, and drive and/or output of the continuous converter 4c being by direct drive or through in-line driving gears, depending on the design. The power is split on the input side into two branches, one branch feeding the infinitely variable converter and if appropriate again summed with the other branch in a summing gear 5c. Power split transmissions consist of one or more gear shift ranges. Switching from one gear shift range to another is preferably carried out at one end adjustment point of the hydrostat, the setting within the switching phase remaining unchanged, with the exception of any minor adjustments. Thus for example with a 4-speed transmission, as shown in FIG. 3, the hydrostat passes through the entire transmission range four times from one end of the scale to the other. With this gearbox as per FIG. 3, the hydrostat is at its maximum negative setting when moving off with clutches K5 and KV closed and after closing clutch 1.

For moving off, the hydrostat is now swung back to "zero" and then to the other end of its adjustment range (positive end of the scale), where at the end of the first and the beginning of the second gear shift range, with all clutch elements running synchronously, the second gear shift range is selected by closing clutch K2 and opening clutch K1. The hydrostat is now turned down to "zero" within the second range, and then switched to the negative end of its adjustment, to select the third range by closing clutch K3 and opening clutch KV. The third range is now [selected] again by turning down the hydrostat through "zero" and on through to its positive maximum adjustment, where at the end of the third range clutch K4 is now synchronously engaged, and the fourth range is selected if clutches KV and K3 are open. By turning down the hydrostat to its opposite adjustment limit, corresponding to the negative adjustment limit, the hydrostat will for the last time run right through until it reaches the transmission end-point of the gearbox. With this gearbox the mechanical power fraction is fed through helical gear stages 26c and the hydrostatic power fraction through the gearwheel stage 10b, the hydrostatic converter 4c and the drive train 7c with gearwheel stage 228 to the summing gear 5c. The summing gear is here in the form of a multi-shaft planetary gear unit P1 in which the mechanical and hydraulic power is summated. In the first and in the second range the mechanical and hydraulic power flows through the second planetary drive P2 with clutch KV closed. For the reverse range, the first and the second range is made possible by closing the clutch KR, while the direction of rotation in the planetary drive P2 is reversed.

The hydrostatic adjuster maximum mentioned in each case defines the point at which switching to the next operating range occurs, which must not necessarily be the adjustment limit of the hydrostat, but can also be a bit before it, in order for example to be able to compensate for load-related slip of the hydrostatic transmission. Synchronous running of the clutch elements to be closed does not define absolute synchronous running, but the synchronous running range; this range can also contain intentional or unintentional synchronous running errors which can be linked by the switching clutches or range clutches, or can still be incorporated.

Gearboxes of this type are described in greater detail in DE 40 27 724, DE 41 06 746 and PCT/DE 89 00 586, which also form part of this invention. The device disclosed is amongst other things an improved version of this known gear.

In order to improve efficiency and noise attenuation and/or in order to create an effective integrated braking system, the invention provides, amongst other things, one or more hydrostatic non-dissipative operating points, particularly transmission fixed points. For this purpose the hydrostat is switched off or bypassed by suitably constructed devices at one or more operating points, which are located particularly in main operational areas, in order to put them in a non-dissipative condition. This switching off or bypassing device is in the form of a hydrostatic inhibitor KH and/or a range block circuit and/or a stabilizing device KD with or without direct drive without hydrostatic power fraction.

The gearbox is also fitted with a braking device which works in combination with the hydrostatic connection device or the transmission fixed point shifting and the infinitely variable converter 4c.

FIG. 4 shows a power split transmission with a hydrostatic converter 4c and a summing gear 5c. The summing gear 5c can also function as a split transmission, so the designation "summing/split transmission" is also used. The hydrostatic converter consists of a first hydrostatic unit A with adjustable volume, and a second hydrostatic unit B, preferably of constant volume. Both hydrostatic units A and B preferably form one common modular unit which is drive connected directly or through driving gears to the input shaft 1c and on the opposite side directly through further driving gears to a summing gear 5c. The summing gear is preferably in the form of a planetary gear unit, to which can be assigned a further gearbox 5d with or without shifting devices e.g. for range selection for selecting several operating ranges. The power in this gearbox is split on the input side into a hydrostatic and a mechanical branch. The hydrostatic power fraction flows through the driving gears and connecting links 227 via the infinitely variable converter 4c and the driving gears to the summing gear 5c. The hydraulic and mechanical power flow is summed and jointly passed to the output shaft 2c so that the mechanical branch feeds directly or through connecting links to the summing gear 5c. The infinitely variable converter or the hydrostatic transmission 4c is fitted with a hydrostatic connection device as a hydrostatic inhibitor in the form of a brake or clutch KH, which serves to secure the driving shaft 7c of the second hydrostatic unit B, or to link it with the casing 19c of the infinitely variable converter or a fixed part of the transmission so that the supporting moments, well known with power split transmissions, are supported via the above-mentioned clutch or brake, preferably supported on the transmission or converter casing, in order to relieve the hydrostatic transmission, or to keep it torque-free and pressure-free. It is also possible to completely separate the hydrostatic shaft 7c from the hydrostatic unit B by a further clutch, which is not shown.

The function of the hydrostatic inhibitor KH is to keep the infinitely variable converter 4c or the hydrostatic transmission torque-free and/or load-free in the hydraulically non-dissipative operating conditions at hydrostatic setting "zero". This is achieved in such a way that the torque support force from the summing/split transmission 5c at hydrostat zero setting, which is normally in the middle of each range, is not supported on the hydrostat elements but on a corresponding in-line brake or clutch element opposite a fixed casing part or transmission part. In the case of transmissions with several ranges, the hydrostatic transmission will run through its full operating range several times, with the hydraulic non-dissipative state in neutral position, with the hydraulic neutral position (i.e. at setting "zero" of the hydrostatic transmission) corresponding to the hydrostat neutral setting within each gear shift range. This operating point is usually located in a key operating range of the vehicle, where particularly good efficiency is required.

The adjustment characteristic of the hydrostatic transmission is described in greater detail in the above-mentioned power split transmissions as disclosed in DE-A-40 27 724, DE-A-41 06 746 and PCT/DE 89 00 586, which, as already mentioned, constitute part of this invention.

In order to prevent hydrostatic distortion in this adjustment neutral position of the hydrostatic transmission, there is a bypass valve 114c, connected between the two working pressure lines of the two hydrostatic units A and B. This bypass valve can be automatically or manually activated with the hydrostatic inhibitor switched, depressurizing both working pressure lines, or relieving them of differential pressure. The hydrostatic inhibitor or the clutch/brake KH and the bypass valve are ingeniously triggered by the same control pressure, the bypass valve however only being activated after clutch/brake KH has closed, so that the pressure feedback actuates the signal or the control pressure to activate the bypass valve. The hydrostatic inhibitor KH is automatically switchable, e.g. as a function of a defined transmission dwell time in the hydrostat neutral position, whereby a preprogrammed time value for this dwell period actuates the corresponding control signal for the hydrostatic inhibitor. For manual switching there is a facility to display this condition, with an optical or acoustic signal to point out to the driver the possibility of shifting. The hydrostatic inhibitor can also be released in a different way, e.g. by an accelerator or gas pedal signal, i.e. when the accelerator pedal position changes or triggered by a load-dependent signal or by various signals determined by variable operating values. With a view to optimizing fuel consumption, e.g. the drive control can be so arranged that the transmission efficiency line and the engine's optimum economy curve are stored, and the vehicle regulator decides (depending on the current operating situation) whether the next gear ratio point should be actuated with hydrostatic neutral position or not. Depending on the type of vehicle, a further parameter can be stored or programmed in depending on the load/noise performance of the transmission as a decision factor. This can for example be helpful for use in an automobile.

In the device disclosed, the hydraulic branch is also switched off at the transmission points of the range selector positions. This means that at the end of the old gear shift range and at the beginning of the new range, the clutches KB for both ranges remain closed, and the hydrostat is fixed in this position and is set to no-load, e.g. by simultaneous activation of the above-mentioned bypass valve and/or precise alignment or correction of the hydrostatic adjustment, in such a way as to both depressurize the hydrostatic working pressure lines and relieve them of differential pressure. In this state the power is transmitted purely mechanically, via the clutches or coupling devices of the two adjacent or neighboring ranges. The switching signals for this circuit can be achieved with the same signals as described for the hydrostatic inhibitor. In the case of a gearbox with e.g. four forward ranges, this gives seven switchable transmission fixed points with the no-load hydrostat.

In the device disclosed there is, as mentioned, a stabilizing device KD or hydrostatic connection device for power split transmission, which holds fixed transmission settings at one or more transmission points at which the hydrostatic power flow can be switched off to further improve efficiency.

As illustrated in FIG. 4, e.g. output shaft $2c$ must be set to no load by a gearwheel stage $10b$ with input shaft $1c$ via an intermediate shaft 227 by engaging a clutch KD under load, in order to relieve the hydrostatic transmission after this clutch closes. For further important ratio points with a high proportion of operation, additional gear stages (not shown) with appropriately allocated clutch can be provided.

A version as per FIG. 3 shows e.g. a stabilization or hydrostatic connecting device which creates a direct drive without meshing or tooth engagement effort between input shaft $1c$ and output shaft $2c$ using a clutch KD, thus setting the converter $4c$ and the summing/split transmission $5c$ to no load.

The stabilization device or hydrostat connecting device KD can also be constructed with two or more clutches (not shown) in order to completely decouple the infinitely variable converter and the summing/split transmission. In combination with a bypass valve as described above and/or a corresponding hydrostatic adjustment device with targeted adjustment regulation, the second clutch can be dispensed with.

The clutch for the hydrostatic connecting devices KH; KB; KD can be of various design, and for the hydrostatic inhibitor KH can for example be fitted to one of the connecting links or drive elements $7c$ between the second hydrostatic unit B and the summing gear $5c$ as desired. The clutches KH; KB; KD are preferably designed as positive clutches as in the PCT publication DE-A-87/00 324, DE-A-41 26 650 A1 and as described in greater detail in the European PCT application DE 88/00 563, which constitute part of this invention. The clutch is distinguished in particular by the fact that it has positively switchable clutch elements with a clutch gear toothing with or without deflector toothing, and that by means of a piston which can be hydraulically activated, slide-mounted on a clutch bracket, and by the fact that it is possible to shift during synchronous running or in the synchronous running range, even with a certain relative speed of rotation. It is also possible, as described in the above-mentioned known publications, to provide additional synchronizing devices. This above-mentioned positive clutch has the advantage that it is nearly drag-free, since there are no friction elements. But it is also possible to use the clutch as a friction clutch in the form of a cone friction clutch, as for example shown in DE-A-41 26 650. This clutch too can be largely drag-free, since with the cone effect the friction surface is relatively small. In certain circumstances a multi-plate clutch of familiar design can be suitable. A positive type clutch with mechanical switching elements can also be suitable, (e.g. with shifting claw, gearshift sleeve and/or with servo-assisted shifting elements), depending on the transmission design selected. Alternatively the clutch KH (not shown) can be fitted in place of the hydrostatic inhibitor in the summing gear $5c$. With a version as per FIG. 2 it is preferable to arrange the clutch KH on a shaft $73c$ connected to a traction booster $77c$. In this way traction booster $77c$ and clutch KH can be combined in an integral unit to save space and reduce costs.

The hydrostat must be relieved by the system described above for switching off the hydrostatic unit with the bypass valve $114c$; 216 described above, and/or by a suitably designed hydrostatic adjustment device.

Transmission power loss is reduced by all the above-named devices for switching off the hydrostatic power flow, improving efficiency.

The hydrostatic converter $4c$ is so designed as to further increase efficiency, so that it can run in the casing without any fluid and with low supply pressure without thinning the fluid.

In the device disclosed the transmission has an integrated brake system, for which purpose the hydrostatic converter $4c$ is functionally connected to the converter connecting devices described above or switchable transmission fixed point (see FIG. 4). The hydrostatic transmission $4c$ functions in this respect as a hydrostatic pump, with the braking energy being fed via working pressure lines and appropriately allocated switching and control valves 203, 204 via a heat exchanger 2054. The braking energy value determined by the prevailing operational situation is controlled by the above-mentioned pressure regulator or pressure relief valve and the hydrostatic adjustment. The braking function is based on the fact that in the braking process initially via the control device, the nearest or most suitable switchable transmission fixed point is sought and activated, and when the transmission fixed point has been switched by changing the hydrostat adjustment, torque is generated on one or on both input shafts of the two hydrostatic units A and B, which supports the motor braking moment via the corresponding connecting links 227, 228. The hydrostatic transmission pump power thus generated represents the braking energy which is dissipated via the heat exchanger 205. One or both of the hydrostat units A and B can come into effect as hydrostatic pumps, depending on the operating situation, the braking effect required and/or the type of hydrostatic connecting device KH; KB; KD engaged. If for example the transmission fixed point is switched via the hydrostatic inhibitor KH, the pump power of the first hydrostatic device A can be used. If the transmission fixed point is switched via the range block mechanism KB, both hydrostatic units A and B can come into effect, whereby double braking energy can be taken up. This can be exploited at the end of each range by closing two range clutches, as mentioned, and also at the end of the last range by closing a connecting clutch KD. For example with a power split transmission with four forward ranges, in the device disclosed it is possible to have four transmission fixed points with the above-mentioned double hydrostatic power via the hydrostatic units A and B, and a further four transmission fixed points with the braking power of a hydrostatic unit A. The pressure medium or fluid flow generated by the hydrostatic transmission 4c passes through a pressure line 206 or 207, with one serving as high-pressure line and the other as low-pressure line for the return. A feed pump (not shown) provides constant compensation for the fluid leakage within the pressure system or hydrostatic system.

The functional process is as follows: When the brake is activated after shifting down, as already described, the nearest or most suitable transmission fixed point is selected and switched, putting the hydrostatic transmission initially into a no-load state. For example with transmission fixed point connected through the range block circuit KB, in this state the hydrostatic unit A is normally fully traversed, as a result of which both hydrostatic units keep the corresponding quantity of fluid circulating at the same rotational speed without differential pressure within the transmission modulator. Only after adjustment of the hydrostatic unit A to a smaller volume is the differential quantity of fluid fed to the brake pressure circuit 206 or 207. If the adjustment unit A is set to adjustment value "zero", then the whole pump output of the second hydrostatic unit B, which is normally a constant unit, is fed into the brake working pressure circuit 206; 207. If the hydrostatic setting is moved on through "zero", the adjustment unit A also works as a pump, supplying at the end of its adjustment range, i.e. at full adjustment volume, the same pump output as the constant unit B. In this state the highest brake energy can be transmitted with double pump output, both units A and B being driven by their input shafts 7c and 6c and associated drive trains 227, 228 via the braking moment. Both hydrostatic units A and B can also be of different sizes, the braking power varying according to their size and their allocated rotational speed. If the second hydrostatic unit B is also an adjustment unit, then further variations are possible, e.g. so that both units can be usefully reset at the same time, or first unit B and then unit A, depending on the operational situation. In the case of the transmission variants mentioned above, it is advisable to make the second hydrostatic unit B a constant unit. For the operating condition in which the transmission fixed point is fixed by the hydrostatic inhibitor and by closing the clutch KH, braking energy can only be transmitted through the first hydrostatic unit A, which is driven by the corresponding drive train 227. In most operational situations this is sufficient. In the event of a higher braking energy requirement, this clutch KH can be opened and another transmission fixed point triggered very rapidly by automatic interplay of the control device. In the device disclosed there is automatic short-term engagement of the service brake for this purpose to achieve a continuous braking transition, ensuring gentle, smooth braking over the whole transmission range. If for example there is a change from transmission fixed point KH to transmission fixed point KB within the braking phase, then the service brake is also engaged first by the automatic brake regulator, so that a largely no-load state in the hydrostatic transmission is achieved with automatic resetting of the hydrostat unit A. As the braking energy is automatically reduced by the hydrostatic transmission, the braking effect of the service brake gradually increases. To find the above-mentioned transmission fixed point KB by triggering the corresponding range block circuit, the hydrostatic transmission is now brought into the appropriate end position or final setting, after which the service brake is gradually released when the above-mentioned transmission fixed point has finished shifting and the hydrostatic transmission has been adjusted, and the hydrostatic braking power absorbed. This functional sequence can be achieved by means of suitably adjusted signal values from several operational values such as brake pressure signal, hydrostatic pressure signal, adjustment signal of the hydrostatic transmission and/or engine speed signal and/or further signals.

The hydrostatic braking device consists of a non-return valve 209 and the hydrostatic converter 4c, through which the fluid flow of the high-pressure line 206 or 207 is fed to a pilot valve 203 and a subsidiary pressure regulator 204. The pilot valve 203 is switched by means of an opening signal 214 to enable the hydrostatic braking function. The pressure control valve 204 is activated by a variable control signal 215, which is a function of the braking force, and determines the hydrostatic pressure. The heat exchanger 205 is subordinate to the pressure regulator 204 which takes up the heated fluid flowing from the pressure regulator, via a corresponding line 217, and returns the cooled fluid to the working pressure circuit of the braking system through an additional line 213 and a non-return valve 210.

In the device disclosed there is also a braking device as shown in FIG. 5 with a power accumulator 220. This power accumulator can be an accessory to the hydrostatic braking device described above. For this purpose the device has in addition the above-mentioned store 220, a store pilot valve 221, a store emptying valve 222 with a corresponding trigger signal 223. The inflow from store 220 is through a line 224, and the outflow through a line 225. A hydrostatic accumulator or pressure store would be suitable as a power accumulator.

When combining the accumulator system with the hydrostatic braking device described above, it is advisable to feed back first the power accumulator with the braking energy and then, triggered by a corresponding pressure signal, the braking energy through the control unit 204 or pressure regulator using the heat exchanger 205. It is also possible to control a mixed function, whereby for example in the case of spontaneous and/or very high braking energy input, the accumulator and the device using the cooling system or the heat exchanger 205 respond at the same time. A corresponding matched braking function is possible for transmitting a variable signal 223 via the pressure regulator 204, its cooling system control signal 215 and the accumulator filling valve or control valve 221 and 222.

The brake regulator is so designed in the device disclosed that a corresponding engine speed is allocated as a function of the operating force and the braking force and/or the amount of braking energy. This means that with low brake force the engine speed is increased only slightly, and with high brake force it is increased correspondingly more. This is of particular value with automobiles as regards noise level. In this connection European patent application 0 280 757 Al and German patent application P 43 15 369.0 should be noted, as constituent parts of this invention.

In the device disclosed the brake regulator is influenced by information from the ABS system (anti-block system) or from one or more signals derived from it, guaranteeing continuous, spontaneous automatic transmission adaptation for precisely adapting the torque or drive power to the current driving situation, further improving road safety and driving comfort. Activation of the transmission by the brake pedal can be transmitted directly to the electronic control unit 5 via the hydraulic braking system and/or electrically e.g. via a potentiometer.

The brake/control valve unit 201 can be divided up as a common modular unit, or in the form of individual modules, with at least one of the valves 203; 204; 209; 210 directly mounted on the hydrostatic transmission 4c, so that the noise level can be optimized especially via the noise and vibration reducing hydrostatic bearing device in the device disclosed. The hydrostatic transmission 4c is a compact transmission with variable displacement pump and preferably fixed displacement motor, with torsional bearing with a suitable bearing device 4d in the transmission case 3, with the moment of reaction or moment of torsion of the hydrostat supported by an elastic torque support 4e, as described in greater detail and illustrated in the unpublished DE-A-44 01 509.7. The connecting lines to the heat exchanger 205 and/or the power accumulator (220) are conveniently, at least in part, in the form of movable or elastic connecting links (e.g. hoses, tip jacks) inside the transmission case 3, in order not to obstruct the elastic, noise-reducing and vibration-reducing hydrostatic bearing device. The noise of the brake valves or the hydrostatic brake device 201 is thus effectively attenuated outwards. The main pressure valve or brake control valve 204 in particular is preferably permanently connected to or integrated with the hydrostatic transmission 4c. At least one of these valves 204; 203; 209; 210 or the whole brake/valve control 201 can be accommodated or integrated in the hydrostat intermediate housing 216, saving space and cost. It can also be advantageous to mount the brake valves on the outside of the hydrostat in modular format, particularly for optional equipment variants. The electrical control valves for the brake pressure regulator 204 and/or the valve 203 with their control lines 215 and 214 can usefully be arranged as separate modular units, e.g. in a central control block, these being expediently in the form of pilot valves, and connected to the corresponding valve 204 or 203 by elastic or independently mounted control lines.

A braking element is fitted in the transmission variant shown in FIG. 2, preferably a hydrodynamic retarder 77c, which acts as traction booster and in a form whereby the torque of the second hydrostatic unit B acting as supporting moment is boosted for the starting range, and the hydrostatic transmission or the second hydrostatic unit B is relieved accordingly. The device can be used for power distribution systems in which the first range has power distribution and, as already mentioned, the starting traction depends on the size of the supporting moment acting on the second hydrostatic unit B. This applies e.g. to the known transmission systems mentioned above and to the system shown in FIG. 3.

The brake or retarder element 77c, 82c for boosting traction is connected to the intermediate shaft 73c. It can with great advantage be designed as an alternative modular unit in the front cover 61c, saving space and being easy to produce, preferably as a common modular unit with the front cover 61c. The retarder 77c can be connected to any part of the drive train 7c, 73c of the second hydrostatic unit B (not shown).

The brake or retarder element 77c serves, as already mentioned, as traction booster in the starting range, the retarder being activated via hydraulic fluid which can be modulated as a function of the hydrostatic pressure. In the device disclosed, from a particular hydrostatic pressure filling of the retarder is automatically triggered by the corresponding pressure signal. An additional signal can form a rotational speed signal, resulting from the rotational speed or the input shaft 1c or of the drive motor, and/or from the rotational speed of the second hydrostatic unit B. The hydrostatic pressure signal and rotational speed signal can form a common control signal for the retarder 77c. A further usable signal can also be an adjustment signal of the first hydrostat unit A, which serves in addition or instead of the rotational speed signal of the second hydrostat unit B. In connection with the engine drive speed signal, the above-mentioned adjustment signal also represents a value for the speed signal of the second hydrostatic unit B. Function preselection is determined automatically with the switching of the first forward or the first reverse range. It is also possible to engage this function optionally, e.g. by a light or acoustic signal to the driver, derived from the hydrostatic load or the hydrostatic pressure.

The traction booster also makes it possible to reduce the dimensioning of the hydrostatic converter 4c, by substantially reducing the start-up stresses which determine the dimensioning for the hydrostat.

Instead of the hydro-dynamic retarder 77c, a friction brake device can also be used for example as multi-plate clutch, as already described for the hydrostatic limited slip clutch KH. A precondition for this however is that the operating point with very high traction occurs only very rarely, and/or that the brake or clutch KH can be fully closed very rapidly, in order to minimize wear. With a power split transmission with e.g. four forward ranges, the operating point at which the hydrostatic shaft of unit B can be fixed is at a very low road speed, at which the maximum traction forces of the vehicle apply. For this reason it is altogether possible to operate this gear ratio point, which can be switched as first transmission fixed point, ideally with a friction clutch. A positive clutch, as described above, preferably with deflector toothing, can usefully be applied, but with this arrangement the gear-shift can only be shifted when the corresponding hydrostatic shaft is at rest. In the start-up range, traction is generated via the hydrostatic transmission up to this transmission fixed point with corresponding hydrostatic pressure, which can then be relieved after the above-mentioned clutch KH has closed. A combination gear-shift of the hydro-dynamic retarder 77c with the hydrostatic connecting clutch can also usefully be applied, especially with vehicles with heavy usage in the lower speed range with very high traction. It is advantageous in this case to first activate the hydro-dynamic retarder 77c, and to engage the friction clutch KH sequentially.

The brake control is so designed in the device disclosed that a preset braking profile comes into effect in such a way that when the brake is activated, first a defined engine torque is generated by reducing the gear ratio and correspondingly increasing the engine speed. Not until the engine speed has been increased to a defined level does the service brake start to operate, e.g. as a function of a corresponding engine speed signal. At the same time or after application of the service brake, the hydrostatic brake described can if necessary cut in through the hydrostatic converter 4c, so that there is continuous brake application without overloading the service brake. The hydrostatic brake device, which is mainly in the form of a retarder, can also be used in this case analogously for short-term service brake use to reduce wear on the brake linings of the service brake system. With a view to acoustically acceptable brake operation, the proportion of engine braking can be kept relatively low in the device disclosed by also using the hydrostatic converter 4c as a braking system, in which case, as already described, at each transmission fixed point the hydrostatic brake can cut in or be engaged. The brake pressure valve 203, 204 is preferably mounted directly on the hydrostatic converter 4c which is preferably elastically mounted in the transmission to reduce noise and vibration. The brake valve noise is in this way effectively insulated to the outside. The hydrostatic converter 4c here preferably has a three-point bearing with vibration-reducing, partly elastic supports as described in greater detail in DE-A-42 35 728. This patent application constitutes an integral part of this invention.

The hydrostatic braking system above the hydrostatic converter 4c has in the device disclosed alternatively a warning signal system in the form of a warning light or audible tone to indicate that in the non-automatic or semi-automatic version the service brake should be operated manually to lower the engine speed and make it possible to reduce the gear ratio to the next lower range or next transmission fixed point.

The control device can be designed as described in greater detail below or to some extent in the European patent application 0 280 757. The control device has a device to achieve smooth acceleration and generally increase performance, which meters the adjustment speed largely as a function of load, adapting to the driving situation and the driver's preferences within the constraints of the engine's maximum power.

The invention moreover represents an improvement in shifting quality of the transmission or its equipment as per DE 41 26 650.

A known transmission of this type is disclosed in DE 38 38 767 also takes a volume correction into account in the shifting process to improve the shifting quality. In the case of this known transmission, the correction ratios are the same in all range selections. In the object of the invention by contrast there correction is volumetric, and adapted to the various mechanical gear ratios or the various ranges.

It is characteristic of infinitely variable hydrostatic-mechanical split transmissions that after each change of range or range selection, the hydrostatic units A and B exchange their functions as pump and motor. The load-dependent hydrostatic transmission drive slip, or the shaft 5 connected to the hydrostatic unit B, has the reverse effect after each range selection, which has to be corrected within the switching phase by the adjustment device to ensure a smooth shift.

The function of the invention is to create a shifting device, preferably for automatic transmissions, particularly for infinitely variable split transmissions of the type indicated above with positive clutches with or without deflector toothing or friction clutches with cone friction surfaces, as disclosed in DE 41 62 650, or with known multi-plate clutches, ensuring a high quality of shifting with uninterrupted load.

Fluid leakage from the hydrostatic transmission results, as mentioned above, in positive drive slip of the hydrostatic shaft 7c. The effect of this drive slip in combination with an infinitely variable power split transmission with several selectable ranges, as shown in FIG. 7, is that under load for example, the setting (V old) must exceed the theoretical value by the dimension X at the shift point, in order to reach the synchronizing point of the clutch elements to be switched and synchronize their shifting. The setting or the maximum adjustment volume must be dimensioned correspondingly large in the case of the transmission design. Because of the functional reversal of pump and motor referred to earlier, with reversal after shifting to the next range, the drive slip also has the reverse effect, which [exceeds] the adjustment correction value by the value Y, and thus corresponds to the adjustment value (V new). As a rule, the correction values X and Y are different, as a result of the transmission design concerned and range values corresponding to the different values of the hydrostatic pressures $\Delta p1$ and $\Delta p2$ or $\Delta p$ old and $\Delta p$ new at the end of the old shift range and the beginning of the new one. Within the switching phase, the adjustment of the hydrostatic transmission must be corrected as a function of the load condition, by the correction figure X+Y=Z. After a shifting example as shown in FIG. 7, where B1 means range 1 and B2 range 2, the sequence is as follows:

When shifting up under load from B1 to B2, the shift signal to close the new or second range clutch is triggered, as soon as the clutch element drive connected to the second hydrostatic unit B has reached synchronous running with the clutch elements at shift point S to be shifted. The hydrostat setting (V old) in this case exceeds the theoretical value (V th) by the figure X. Now there is a shift to the new or second range or the second range clutch closes after the synchronization pulse, with the old or first range clutch remaining closed. The hydrostatic adjustment is now reduced by the figure Z in both closed clutches until the set point SK1 is reached, after which the signal to open the old or first range clutch is given. Only then is the gear ratio changed further when the hydrostat is further adjusted, in order to pass through the new or second range.

In order to take account of the differing drive slip values of the hydrostatic transmission at the end of the old shift range and the beginning of the new one with the correspondingly different individual adjustment correction figures X and Y to optimize shifting, there is in the device disclosed a control for adjusting or correcting the volume for the setting (displacement volume) (V new) of the adjustable hydrostatic unit A, the specific relation being expressed as follows:

1) V new=V old−(V old−V new)*fz 2) fz=$\Delta p$ old+$\Delta p$ new=correction factor $$\Delta p \text{old}$$

where the correction factor (fz) represents an amplification factor for the individual correction value X or Y of the old range, from which the total correction value Z is derived. The correction factor (fz) is a fixed value determined by the applicable mechanical gear ratio, and can have a different value for each of the transmission fixed points of the individual range selections. This means that e.g. with a four-range transmission, as shown in the diagram in FIG. 3, with a particular gear or range gradation, the correction factor (fz) can be 1.85 for shifting up from range 1 to range 2 (range selection ½), 3.04 for the ⅔ shift, and 2,75 for the ¾ shift. (fz) is thus determined by the specified ratio of the individual shift ranges to each other or, as mentioned above, by the fixed mechanical gear ratios, by which the various pressure ratios of the hydrostatic transmission at the end of the old and at the beginning of the new range are defined with constant load. The above-mentioned relation 1)

applies to all shift settings, whether traction/drive shift or shifting up/down, although when reducing the gear ratio, the total correction value Z is calculated not from X but from Y, as illustrated by formula 2). For reducing the gear ratio, the above-mentioned four-range transmission as per FIG. 8 for example with the same aforementioned transmission design has fixed correction factors (fz), for example for the range selection 2/1=2.17, for the range selection 3/2=1.49 and for the range selection 4/3=1.57.

When there is a fixed ratio for the correction factors (fz) both for shifting up and for shifting down, they can be programmed into the control unit or the processor as constant computation factors, omitting the additional costly devices for the pressure signals for Δp old and Δp new. If the hydrostat pressures Δp old and Δp new are used to determine the correction factor (fz), they can be calculated with sufficient accuracy both from the differential pressures and also from the absolute hydrostat pressures. The above-mentioned relation for the shift correction is a reasonable approximation based on the assumption that the drive slip of the hydrostatic transmission approximates to the hydrostatic pressure. Any significant disproportionate differences arising can be taken into account accordingly, e.g. by a other adaptation of the factor (fz) or an adaptation in a further factor (fk) described later.

Taking into account various operating conditions, an additional correction factor (fk) is provided in the device disclosed to take account of various influencing variables such as type of clutch (multi-plate, cone, denture or general friction clutch) and/or fluid temperature and/or adjustment speed and/or further operational variables. The applicable volumetric correction or adjustment correction is determined by the following relation:

$$V\text{new}=V\text{old}-(V\text{old}-V\text{theor.})* fz* fk$$

The total correction value Z is reduced in this case by a fixed constant or variable factor (fk) in accordance with the above-mentioned parameters. This means e.g. that the opening signal for the old clutch is triggered earlier or later depending on the type of clutch.

A further adjustment correction variant is a facility for using the hydrostatic pressure (Δp old) to determine the new adjustment value, the new adjustment value V new being limited by a pressure signal (Δp new) in the relation:

$$\Delta p\text{new}=\Delta p\text{old}*fzp*fk, \text{ or, as an approximation}$$

$$p\text{new}=p\text{old}*fzp*fk$$

where (fzp) represents a constant determined by the transmission design, the value of which is expressed by the relation:

$$fzp=\Delta p\text{new}/\Delta p\text{old}$$

The setting of the hydrostatic transmission is [determined] by an electrical value, e.g. the flow rate of the proportional valve of the hydrostat adjustment and/or a direct flow rate signalled by a potentiometer connected to the hydrostat adjuster. With a view to especially precise adjustment values for range selection to achieve the best possible quality of shifting, it is advisable to provide a direct hydrostatic adjustment value using a potentiometer, in addition to the electrical current of the proportional valve needed for the hydrostatic adjuster or the purely hydraulic adjustment control, where the current signal from the potentiometer provides the precise measurement and switching signals for the hydrostatic adjustment device. Direct transmission of the setting or of the hydrostat adjustment angle can also be achieved with known mechanical and/or hydraulic or electrical means, which can be used for shift correction in the device disclosed.

The shift correction described is particularly suitable for continuous power split transmissions such as described in greater detail e.g. in the European patent documents 0 222 108 or 0 386 214 or 0 238 521, the contents of which constitute an integral part of this invention.

The circuit diagram shown in FIG. 8 and the transmission diagram FIG. 3 show in schematic form the construction of a continuous power split transmission with hydrostatic converter 4c, and a view of the control with the control valves for the range clutches. This transmission contains four hydromechanical forward and two hydromechanical reverse ranges. The transmission also has a locking device FH in the form of a brake or positive locking device, to protect transmission links from uncontrolled rotation even before the engine starts and/or before a clutch is activated when the vehicle is at rest. In this case e.g. an internal planetary gear unit gearwheel is fixed e.g. by a spring-loaded transmission member, which is automatically switched off by fluid pressure acting against the pressure of the spring after the range is engaged or after preselection via the selector 108, as soon as the first forward or reverse range, or the corresponding direction of travel is preselected. After starting the engine and with the selector device in neutral, in the device disclosed a range selection clutch (preferably clutch KV or clutch KR) closes, to ensure the output transmission members come to rest. A "parking" gear of known design provides an additional device or locking brake, which locks the output shaft opposite the gearbox with the vehicle at rest.

For the hydrostatic braking device or the hydrostatic retarder shown in FIG. 4, or energy-saving device shown in FIG. 5, there is also in the device disclosed a device for reducing the noise level by reducing the noise level of the hydrostat 4c, with one or both of the control disks or valving surfaces being twisted through a certain angle, as already shown in FIG. 7 of the known publication DE 39 01 064. The twist signal can preferably be automatically twist triggered in drive mode or braking mode, e.g. as described in the known publication mentioned above.

In the device disclosed there is also a device for improving the efficiency of the transmission and improving the pollutant emissions performance, in which the efficiency characteristic values of the engine and of the transmission (engine and transmission efficiency characteristic curves) are stored in the electronics and/or the control unit 5, and act as an information source for the transmission control. The electronics and/or control device 5 determines the most suitable engine speed for each operating condition, taking into account the optimum engine and transmission efficiency points, from which the processor 5 calculates and sets the optimum engine speed or gear ratio, using an appropriate comparative formula.

The invention also has devices for improving pollutant emissions performance, taking into account additional operating parameters such as air temperature and air pressure, using suitable sensors and relevant information. For this purpose the engine speed is adapted as a function of the relevant operating and environmental parameters; the parameters for determining consumption and the parameters for optimizing pollutant emissions are included in the overall calculation, to determine the optimum engine speed or the optimum infinitely variable transmission ratio, and automatically make the adjustment with the control unit. Since the optimum consumption point does not always correspond with the lowest emissions condition, the device disclosed provides a facility for determining and programming an appropriate compromise line, also taking into account performance parameters, especially as regards safety, e.g. to achieve good acceleration performance for rapid overtaking maneuvers or to achieve a general sports performance, and the availability of optimum performance.

To start the engine, particularly from cold with a drive combination with an infinitely variable hydrostatic power split transmission, e.g. in a transmission design as illustrated in FIG. 3, in which the hydrostat is set to volumetric displacement when starting up, the invention has a device enabling the vehicle to reach operational readiness or operating temperature in the shortest possible time. When starting the engine, the adjustment volume of the hydrostatic transmission 4c has to be set to zero or a small setting, so that little or no fluid can be fed, in order to keep the driving torque of the hydrostat small. The range clutches K1; K2; K3; K4 are open in this case. In order to be able to get the hydrostat adjustment device into starting position as quickly as possible, where the applicable range clutch (preferably in synchronous condition) can be closed, the hydrostat is traversed as a function of the engine speed or the optimum engine idling speed, the adjustment speed being dependent on the speed at which the fluid heats up, which determines the driving torque of the idling hydrostatic transmission and the engine torque in this operating condition. A corresponding predetermined engine speed, especially idling speed, determines the adjustment speed of the hydrostat by means of its signal size until the starting position is reached before closing the corresponding range clutch. If the hydrostat adjustment is too quick, there would be excessive engine compression because of the excessive hydrostat driving torque arising from the fluid temperature, which is prevented by the above-mentioned engine speed signal. It is expedient for the range clutch concerned in this case to close only after the driver's preselection. Operational readiness can be achieved even more quickly by additional manual or automatic acceleration, e.g. by a suitable Start program. A varying or adapted idling speed can be programmed in the Start program depending on the temperature, high idling speed being allocated to low temperature, preferably fluid temperature. System Ready, with the hydrostatic transmission in starting position, can be indicated by a visual or acoustic signal, with a display for the "not ready" condition, or a brief signal indicating System Ready. The starting position of the hydrostat can be set at a particular setting, preferably at the adjustment limit, depending on the design of the transmission. The signal to set the hydrostatic transmission to start-up after starting the engine can also be triggered automatically depending on the fluid temperature and/or engine speed and/or hydrostatic pressure or differential pressure, or other operational variables. When starting the engine it is advisable to fix the hydrostat adjustment at an adjustment angle of zero or smaller by means of a spring lock known in the art.

With a view to achieving the shortest possible range selection shift time, the hydrostatic adjuster is immediately switched to the opposite direction after the new range clutch engages. This function, like all functions already mentioned related to reduction of shifting time, can be programmed into the control logic as known in the art. The above-named hydrostatic reversal can also be in the form of a suitable shuttle valve (not shown), which may for example be reversed as a function of the control pressure pK2 for the second range clutch (see FIG. 7a).

The range clutches K1 to K4 and KV, KR are preferably designed as positive clutches with or without deflector toothing, as disclosed in DE-A-39 03 010 and DE-A-41 04 167.

As shown in FIG. 6k, both for RQV control and for RQ control the total of the signal values (a)+(b) can serve to form a control signal (c), where (c) is also designated a differential signal for transmission adjustment. As the accelerator pedal travel increases, the accelerator signal (a) decreases, i.e. when the accelerator is combined with a potentiometer with increasing accelerator pedal movement, the control flow for the signal (a) decreases. The differential signal (c nom) preferably forms a constant value across the complete engine speed range. Any deviation from the (c nom) control signal leads to an automatic transmission change, where a deviation towards "+" results in continuous shifting up, and a deviation towards "−" results in shifting down. When starting up, the additional influence of the brake pedal signal (f) causes the differential signal (c) to be depressed (−), in order to ensure the vehicle remains stationary, and when the brake is released and the brake signal (f) withdrawn, the start-up process is initiated. This type of control has the advantage that the hydrostat adjustment is inexpensive to make and can be triggered e.g. with just a solenoid valve or proportional valve or switching magnet with proportional amplifier.

In order to further increase efficiency, the hydrostatic components A and B run in the casing without fluid. There is moreover pressure modulation of the feed and supply pressure of the transmission, dependent on rotational speed or load, especially on hydrostatic pressure, preferably with the stabilization forces for the hydrostat cylinder block of the adjustment unit A and the constant unit B acting on the valve plate or the valving surface via the modulated hydraulic pressure (i.e. with speed-dependent pressure). In addition to that a positive locking piston guide shoe clamp is fitted to prevent reduced efficiency due to friction loss. Similar devices are known from DE-A-39 01 064.

Another version of the hydrostatic brake system is so designed that the pressure relief valve for the hydrostatic pressure between the two high-pressure lines 206 and 207 is in the form of a high-pressure controller 217 or working pressure controller and thus a controllable pressure valve. When braking, the braking power flowing through the hydrostatic transmission 4c is fed in the form of hydraulic fluid through this pressure regulator 217 and, where applicable, a suitably designed valve assembly 218 or 218a to the low-pressure side of the hydrostatic transmission with or without in-line fluid cooler 205. With a view to keeping the fluid temperature within acceptable limits, the braking power is distributed over a large quantity of fluid, which is to say that the pressure regulator 217 can be activated where applicable as a function of a temperature signal and/or pressure signal and/or other load signal or other suitable operating signals, with the applicable quantity of fluid or brake fluid, fed through the pressure valve or pressure regulator 217, adapted at the same time by an appropriate hydrostatic converter (4c) adjustment value. This means that the hydrostat adjustment and high-pressure control determine fluid pressure and flow. The temperature signal is taken from the hotter fluid after the pressure regulator 217 or 215.

A feed pressure valve 233 serves to maintain the feed pressure. It is advantageous for this valve to be designed as a pressure regulator, to provide a variable feed pressure which can be adapted to different operational situations, especially with a view to improving the level of efficiency. In the case of partial load operation the pressure control can for example be influenced by a speed signal and/or further load-dependent signals, to minimize power loss by keeping this feed pressure at the lowest possible level. The pressure regulator 235 in FIG. 4c also fulfills the function of the variable pressure valve 233, the feed pressure serving at the same time as control pressure, e.g. for clutches. In the low load condition, the supply pressure is in this case reduced accordingly to improve efficiency.

In order to achieve an optimum flushing and cooling effect, the fluid fed into the hydrostat system via the feed pump 231 is passed through an infeed device 216 which enables the complete volume of fluid fed in to reach the hydrostatic system and the hydrostat circuit. For this purpose the infeed and outlet orifices are as far as possible from each other, or far enough apart to achieve this effect. As shown in FIG. 4b, the sequence of infeed and outlet through the kidney-shaped orifices 229 of the hydrostatic transmission 4c is such that e.g. the infeed is at one end and the outlet at the other end of the kidney-shaped openings 229. A suitable valve 218a for this purpose is a shuttle valve, activated by the high pressure in the working pressure lines 206 or 207. The outlet fluid or the fluid flowing back out of the hydrostat system through fluid line 237 can be used to supply the other transmission elements such as clutches and for lubrication, with the supply pressure for the transmission and the feed pressure being determined by the pressure valve or pressure regulator 235. It is also advantageous for the transmission elements to be lubricated by this fluid flow, which is controlled e.g. by a restrictor or a flow control valve 238 and its pressure via a lubrication pressure valve 236. The fluid cooler 205 is expediently located downstream of the lubrication pressure limiting valve 236, e.g. as shown in FIG. 4c. In this circuit diagram the full feed fluid volume, less fluid leakage and the relatively small quantity of lubrication oil, is fed via the cooler 205, potentially achieving a correspondingly great and precise cooling effect.

A lubricating pressure valve 236 maintains the lubrication pressure. A safety valve 234 serves to ensure a maximum permissible fluid pressure in the feed pressure system and the corresponding lines 239. This valve 234 can also have adjustable pressure functions related to efficiency, within a limited pressure range, with the fluid pressure one differential pressure higher than the supply pressure generated in the pressure regulator 235 in the lines 237 and 241, dependent on the pressure regulator 235.

A further distinctive feature of the transmission is that the hydrostatic gear unit can operate in a casing without fluid, avoiding fluid thinning loss. The stabilizing forces of the hydrostat elements or the two cylinder blocks for the hydrostatic units A and B are, as already mentioned, automatically adapted as a function of rotational speed pressure (speed signal) and/or a load-dependent signal (e.g. hydrostatic pressure, accelerator position, throttle valve position, volumetric efficiency or other operating signals), to prevent unnecessary friction loss on the contact surfaces of the hydrostatic elements, such as guide shoes and valving surface.

The control device of the vehicle and/or the transmission in the device disclosed has another device which is alternatively or additionally designed to detect driver type, so that an individual program (I program) adapted to the driver type can be manually or automatically selected. This program preferably contains a device with one or several different driving programs, which make it possible to offer a range of possible programs from an extremely economical program (Eco program) through to a high-performance program (S program). Depending on driver type or characteristic driving behavior, this individual program can be accessed or preselected, e.g. by manual setting, perhaps using a pushkey marked with an individual's name, or an automatic individualized setting, e.g. automatic seat adjustment and/or steering wheel adjustment or similar adjustments tailored to the driver concerned. In addition to good acceleration in different operating situations, the driving program also provides a fuel economy facility whereby e.g. with a particular driver type the economy (Eco program) or extreme economy program is automatically triggered by a time-based profile of a steady-state condition in a particular operating condition, e.g. steady cruising, from which the drive control or control logic concludes that this condition is to be maintained for some time, and accordingly adjusts the engine speed to the optimum consumption curve or as close as possible to it. To prepare e.g. for an overtaking maneuver the system briefly departs from this Eco program, or can be overridden by a more or less emphatic driver intervention, e.g. rapid acceleration (accelerator pedal signal), speed of accelerator pedal adjustment, or some other manual intervention as mentioned above, or through any increase in the engine speed at almost constant road speed, e.g. through a control button or lever on the steering wheel or elsewhere, e.g. as shown in FIG. 6a to 6c.

The "Eco program" can be engaged quickly or gradually depending on certain steady state conditions; here too an individual program can be preset to match the driver type, somewhat so that e.g. the "Eco program" is switched on as a gradual transition from "High-performance to economy state". The speed of change relates to the size of the steady-state times at constant speed or to change speeds which can depend on road and/or load profile.

A further feature of the continuous power split transmission in the device disclosed is that to improve range selection (especially in the lower speed range, preferably in the braking and/or drive/overrun mode) when shifting from the higher range to the next lower range, a bypass valve 216; 214; 215 is fitted between the two working pressure lines 206 and 207 of the hydrostatic converter 4c to prevent the service brake and the transmission conflicting during the shifting phase. The bypass function can also respond within a larger speed range, even outside a range, to prevent any possible conflict from the engine drive train/engine transmission when the vehicle is braked by the service brake. In this case the drive is thus automatically fully or partially switched off by the bypass function mentioned above. The bypass valve mentioned above can be in the form of a non-variable or variable valve or pressure valve. With the control valve version it is possible to achieve a more or less targeted partial disengagement of the drive train (engine and drive wheels), preferably maintaining or setting a differential pressure between the two working pressure lines 206 and 207. The size of the above-mentioned differential pressure and its pressure profile determine the remaining proportion of drive through the transmission. With a view to high shift quality when braking, the control of this bypass pressure valve 216; 214; 215 ensures a matched, continuous pressure profile. A subsequent targeted transmission adaptation, especially after a braking and/or drive/overrun sequence, is preferably achieved by the bypass function being switched off by the corresponding control signals, preferably with a continuous pressure profile, after the road speed has been matched to the gear ratio. The above-mentioned continuous pressure profile can also be used as control signal for the corresponding transmission adaptation. A brake signal, preferably triggered by the brake pedal, can also be used as control signal and/or additional control signal to control the bypass valve.

In this way it is possible to balance a precise transmission gearing profile, which is difficult in certain situations. Excessive stressing of the clutch elements as a result of transmission and brake working against each other is avoided in this configuration, and at the same time smooth, comfortable braking of the vehicle is maintained. Depending on the vehicle type, these bypass functions can be of particular value with sharp braking, especially emergency braking.

A further braking device is fitted to ensure that the range clutch concerned opens when the transmission and brake conflict excessively in order to switch off the direct drive during the braking phase or until the vehicle comes to rest, depending on the vehicle deceleration or braking force required. This can be necessary especially in the case of emergency braking.

The bypass valve 216; 114c; 217; 233; 214; 215 described above can at the same time serve as brake valve for the hydrostatic retarder operation and as pressure relief valve for the hydrostat 4c. The bypass valve described above is preferably a pressure valve or pressure regulator, which is not necessarily a bypass valve but may be a pressure valve so designed that overflowing fluid can flow directly to the sump with or without an intermediate fluid cooler, where there are only small or differential amounts of fluid.

A further improvement to range shifting in braking and drive/overrun mode is achieved by the combination of transmission braking induced by the braking signal in the transmission gearing, and the bypass valve described above. The influence of the braking signal increases the engine speed because of the corresponding change in gear ratio, which at the same time has a positive influence on shifting sequence spontaneity, since with higher speeds, control pressures and control fluid flow are improved, both for the hydrostat adjustment and the clutch switching elements. The brake signal, transmission signal and/or engine speed signal (and/or where applicable an automatic cylinder fill or throttle valve setting signal, and other operating signals) combine to achieve smooth, comfortable range shifting, even in extreme braking and drive/overrun situations. For this purpose the braking force is apportioned over the normal service brake system, and the transmission brake apportioned so as to prevent the transmission brake and the service brake conflicting, by suitably adapted metering of the service brake and transmission or retarder braking system by the interaction of the above-mentioned signals. The engine braking force is so apportioned in this case as to keep engine noise within acceptable limits. For example at very low road speeds the engine braking force can be very low despite relatively high braking force; it is advantageous to pre-program an appropriate engine speed control depending on the road speed and/or the transmission gearing and or braking force. One advantage of this is that at a low speeds the proportion of transmission braking supported by the engine is relatively large even at a low engine speed, because of the correspondingly large transmission gearing. In the device disclosed an engine speed reducer, preferably with an infinitely variable profile, should be programmed with vehicle deceleration or braking.

With a view to achieving smoother braking, particularly in the lowest speed range, it is advantageous to design the function of the bypass valve 216, 114c, 217, 216, 233, 214, 215 so that a minimum differential pressure is maintained between the two working pressure lines 206 and 207 to provide infinitely variable transmission control during the braking phase, in such a way that after the bypass valve or pressure valve has been triggered, a minimum fraction of braking force remains in effect via the transmission. This is in particular of significance if the transmission control has to carry out a switching phase from a higher to a lower shift range, briefly interrupting the continuous change in gearing ratio.

I claim:

1. A hydrostatic/mechanical power split transmission for power vehicles comprising:
    an infinitely variable hydrostatic converter having a first hydrostatic unit of adjustable volume and a second hydrostatic unit;
    a power distribution device in which the driving power is split into a hydraulic and a mechanical branch and is summed again before the transmission output, whereby the infinitely variable converter is driven via a drive shaft and is drive connected to a distributing/summing transmission; and
    at least one of a clutch element and a brake element which may be actuated selectively to provide a transmission point at which hydrostatic bridging takes place so that there is a purely mechanical transmission of power, said infinitely variable hydrostatic converter being relieved of load at such point so that no power is transferred,
    said transmission having an arrangement such that a transmission fixed point with hydrostatic bridging is provided at the point where a hydrostatic shaft of the second hydrostatic unit is at rest, said infinitely variable hydrostatic converter being held in this state by actuating at least one of a clutch element and a brake element.

2. A hydrostatic/mechanical power split transmission for power vehicles comprising:
    an infinitely variable hydrostatic converter having a first hydrostatic unit of adjustable volume and a second hydrostatic unit;
    a power distribution device in which the driving power is split into a hydraulic and a mechanical branch and is summed again before the transmission output, whereby the infinitely variable converter is driven via a drive shaft and is drive connected to a distributing/summing transmission; and
    at least one of a clutch element and a brake element which may be actuated selectively to provide a transmission point at which hydrostatic bridging takes place so that there is a purely mechanical transmission of power, said infinitely variable hydrostatic converter being relieved of load at such point so that no power is transferred,
    said transmission having an arrangement such that a transmission fixed point with hydrostatic bridging is provided at the range limits of two neighboring gearshift ranges, which point is determined by switching range clutches of the two neighboring ranges.

3. A transmission as set forth in claim 1 or claim 2, wherein a second one of a clutch element and a brake element is provided for a second transmission fixed point, said second element providing a drive coupling between the drive shaft and an output shaft, said second element being located at the end of a gear ratio.

4. A transmission as set forth in claim 1 or claim 2, wherein is included a hydrostatic circuit comprising a brake pressure circuit and one of a pressure valve and a pressure regulator, said hydrostatic circuit being connected to said hydrostatic converter, the arrangement being such that the hydrostatic converter acts and can be controlled as a hydrostatic brake at said transmission fixed point by adjusting the hydrostatic/mechanical transmission.

5. A transmission as set forth in claim 4, wherein brake regulation can be influenced and regulated by an electronic control unit after the brake has been activated by at least one operating signal.

6. A transmission as set forth in claim 4, wherein the transmission components are arranged so as to carry out the following brake functions in the following order:
   (a) brake signal acts to reset the transmission ratio so that predetermined defined engine braking torque and/or engine speed is built up;
   (b) control unit activates said transmission fixed point;
   (c) when the transmission fixed point has been activated, hydrostatic adjustment is carried out to support the engine braking torque;
   (d) if appropriate, the service brake is activated or the service brake proportion is increased; and
   (e) if necessary, further reduction to lower vehicle speed depending on the driver's preference or brake activation.

7. A transmission as set forth in claim 1 or claim 2, wherein a control program for brake operation is provided which makes changing the transmission ratio a function of one of engine braking torque and a defined engine speed, whereby the engine speed signal determines the braking proportion of the hydrostatic converter.

8. A transmission as set forth in claim 1 or claim 2, wherein in a braking operation during activating said transmission fixed point, a service brake is provided for at least a part of the braking function in the transition phase, and with manual shifting, at least one of an acoustic and an optical signal is provided to indicate to a driver the time to shift.

9. A transmission as set forth in claim 1 or claim 2, wherein is included a shifting device for activating said transmission fixed point in the form of a positively switchable clutch which can be switched by means of a hydraulically activated piston rigidly fixed on a multi-connector.

10. A transmission as set forth in claim 1 or claim 2, wherein is included a fixed point activating device which is automatically switchable, the arrangement being such that a switching signal is automatically triggered as a function of at least one operating signal, and wherein the automatic activation of said transmission fixed point is programmed such that it is automatically triggered after a defined time domain of the hydrostatic adjustment.

11. A transmission as set forth in claim 10, wherein the switching signal results from the closing action of at least one of a corresponding range clutch and a corresponding hydrostatic bridging device.

12. A transmission as set forth in claim 1 or claim 2, wherein transmission fixed point activating is automatically activated by a signal resulting from the occurrence of at least one operating function.

13. A transmission as set forth in claim 1 or claim 2, wherein is included a stabilizing device creating a direct drive between the drive shaft and the output shaft by a clutch closing.

14. A transmission as set forth in claim 1 or claim 2, wherein a traction booster is provided in the form of a brake element which is drive connected with the driving shaft of the second hydrostatic unit and serves to increase the supporting moment to the second hydrostatic unit in the vehicle starting range, whereby the traction booster can be activated, said traction booster being designed as a brake element in the form of at least one of a hydrodynamic retarder, an electric retarder and a friction brake.

15. A transmission as set forth in claim 1 or claim 2, wherein a selector device is provided which enables automatic switching of at least one of a clutch element and a brake element which provides hydrostatic bridging, according to a fixed characteristic profile by pre-selection, whereby the hydrostatic bridging process is switched off automatically as a function of at least one operating parameter.

16. A transmission as set forth in claim 1 or claim 2, wherein the transmission drive shaft and the transmission output shaft are arranged coaxially to each other, and there is a purely mechanical power flow through gearwheel stages and an intermediate shaft through a stabilizing device when a clutch closes.

17. A transmission as set forth in claim 1 or claim 2, wherein a corresponding hydrostatic bridging device can be manually activated by individual selection at one of an appropriate operating point and said transmission fixed point, whereby the process is switched off automatically as a function of at least one operating parameter.

* * * * *